US012786786B2

(12) United States Patent
Xu et al.

(10) Patent No.: US 12,786,786 B2
(45) Date of Patent: Nov. 3, 2026

(54) NETWORK CAPACITY OPTIMIZATION METHOD, APPARATUS, AND SYSTEM

(71) Applicant: HUAWEI TECHNOLOGIES CO., LTD., Shenzhen (CN)

(72) Inventors: Ruiyue Xu, Shanghai (CN); Xiaoli Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/631,338

(22) Filed: Apr. 10, 2024

(65) Prior Publication Data

US 2024/0267784 A1 Aug. 8, 2024

Related U.S. Application Data

(63) Continuation of application No. PCT/CN2022/123424, filed on Sep. 30, 2022.

(30) Foreign Application Priority Data

Oct. 11, 2021 (CN) .......................... 202111184353.8

(51) Int. Cl.
*H04W 28/02* (2009.01)
*H04W 24/02* (2009.01)

(52) U.S. Cl.
CPC ....... *H04W 28/0289* (2013.01); *H04W 24/02* (2013.01)

(58) Field of Classification Search
CPC ..... H04W 16/18; H04W 16/22; H04W 24/02; H04W 28/0289; H04L 41/0631;
(Continued)

(56) References Cited

U.S. PATENT DOCUMENTS

2013/0272132 A1* 10/2013 Heo ...................... H04L 5/0037 370/236.2
2015/0043386 A1 2/2015 Racz et al.
(Continued)

FOREIGN PATENT DOCUMENTS

CN 104125581 A 10/2014
CN 112105034 A 12/2020
(Continued)

OTHER PUBLICATIONS

3rd Generation Partnership Project; Technical Specification Group Services and System Aspects; Management and orchestration; Intent driven management services for mobile networks; 3GPP TS 28.312 V0.5.0 (May 2021) (Year: 2021).*
(Continued)

*Primary Examiner* — Benjamin H Elliott, IV
(74) *Attorney, Agent, or Firm* — Maier & Maier, PLLC

(57) ABSTRACT

A network capacity optimization method, an apparatus, and a system. The solution is used to adjust a network capacity of an area based on a network capacity optimization requirement, so that network capacity performance of the area satisfies a requirement. The solution includes: obtaining network capacity optimization requirement information that includes at least a network capacity optimization target, where the network capacity optimization target is used to describe a requirement for network capacity performance of a first area; determining, for the first area based on the network capacity optimization requirement information, a network capacity optimization solution used to address at least a network capacity issue that exists in the first area; and optimizing a network capacity of the first area by using the network capacity optimization solution.

19 Claims, 5 Drawing Sheets

(58) Field of Classification Search
CPC . H04L 41/0823; H04L 41/0896; H04L 41/12; H04L 41/342; H04L 41/5009; H04L 41/5025; H04L 41/5051
See application file for complete search history.

(56) References Cited

U.S. PATENT DOCUMENTS

| | | | | |
|---|---|---|---|---|
| 2017/0134970 | A1* | 5/2017 | Zhang | H04W 28/0205 |
| 2019/0182177 | A1* | 6/2019 | Bugenhagen | H04L 47/56 |
| 2019/0238410 | A1* | 8/2019 | Kang | H04L 41/40 |
| 2019/0261197 | A1* | 8/2019 | Bellamkonda | H04W 16/18 |
| 2020/0029230 | A1* | 1/2020 | Bellamkonda | H04L 41/0823 |
| 2020/0127924 | A1* | 4/2020 | Bugenhagen | H04L 47/125 |
| 2020/0136917 | A1* | 4/2020 | Kang | H04L 43/0817 |
| 2021/0360474 | A1* | 11/2021 | Chen | H04W 28/08 |
| 2024/0179210 | A1* | 5/2024 | Rodrigo | H04L 67/51 |
| 2024/0179566 | A1* | 5/2024 | Lee | H04W 28/082 |
| 2024/0267784 | A1* | 8/2024 | Xu | H04W 16/22 |
| 2024/0291733 | A1* | 8/2024 | Westerberg | H04W 28/24 |
| 2024/0362034 | A1* | 10/2024 | Sood | G06F 9/505 |
| 2025/0088908 | A1* | 3/2025 | Shi | H04W 24/02 |

FOREIGN PATENT DOCUMENTS

| | | |
|---|---|---|
| JP | 2016195400 A | 11/2016 |
| JP | 2016197888 A | 11/2016 |
| WO | 2013136812 A1 | 9/2013 |

OTHER PUBLICATIONS

3rd Generation Partnership Project; Technical Specification Group Services and System Aspects; Telecommunication management ; Study on scenarios for Intent driven management services for mobile networks (Release 16); 3GPP TR 28.812 V0.3.0 (Jan. 2019) (Year: 2019).*

"A Survey on Intent-Driven Networks"; Pang et al.; Digital Object Identifier 10.1109/ACCESS.2020.2969208; Jan. 2020 (Year: 2020).*

"Intent Aware Network Autonomy"; Huawei; vol. ISG ENI Experiential Networked Intelligence, Apr. 8, 2019 (Year: 2019).*

English translation ISR for PCT/CN2022/12324; Huawei; mailed Jan. 3, 2023 (Year: 2023).*

RFC 7575; "Autonomic Networking: Definitions and Design Goals"; Behringer et al.; Jun. 2015 (Year: 2015).*

RFC 9315 "Intent-Based Networking—Concepts and Definitions"; Clemm et al.; Oct. 2022 (Year: 2022).*

3GPP TS 28.628, "3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 16)", 3GPP Organizational Partners, Sep. 2020, V16.1.0, 64 pages.

3GPP TS 36.413, "3rd Generation Partnership Project; Technical Specification Group Radio Access Network; Evolved Universal Terrestrial Radio Access Network (E-UTRAN); S1 Application Protocol (S1AP) (Release 16)", 3GPP Organizational Partners, Oct. 2021, V16.7.0, 424 pages.

3GPP TR 28.812, "3rd Generation Partnership Project; Technical Specification Group Services and System Aspects; Telecommunication Management; Study on Scenarios for Intent Driven Management Services for Mobile Networks (Release 17)", 3GPP Organizational Partners, Dec. 2020, V17.1.0, 45 pages.

3GPP TR 28.812, "3rd Generation Partnership Project; Technical Specification Group Services and System Aspects; Telecommunication Management; Study on Scenarios for Intent Driven Management Services for Mobile Networks (Release 17)", 3GPP Organizational Partners, Sep. 2020, V1.0.0, 47 pages.

* cited by examiner

NETWORK CAPACITY OPTIMIZATION METHOD, APPARATUS, AND SYSTEM

CROSS-REFERENCE TO RELATED APPLICATIONS

This application is a continuation of International Application No. PCT/CN2022/123424, filed on Sep. 30, 2022, which claims priority to Chinese Patent Application No. 202111184353.8, filed on Oct. 11, 2021. The disclosures of the aforementioned applications are hereby incorporated by reference in their entireties.

TECHNICAL FIELD

Embodiments relate to the field of communication technologies, and to a network capacity optimization method, an apparatus, and a system.

BACKGROUND

A network architecture of a 5th generation (5G) mobile communication technology is more flexible than that of the previous mobile communication technology. The main features are as follows: 5G core network servitization, separation of a central unit (CU) and a distributed unit (DU) of a radio access network (RAN), flexible customization of a network slice, and the like. With development of mobile communication technologies, a requirement on key performance indicators such as network coverage, capacity, rate, and mobility, the requirement on the network capacity, is constantly increasing. The 5G network supports 5G to B industry services (such as a meter reading service, a video surveillance service, and a remote control service). However, the 5G to B industry services have very high requirements on key performance indicators such as a user delay, a call drop rate, and a terminal access quantity. Requirements on the network capacity vary at different moments and different places, and different 5G to B industry services have different requirements on the network capacity. Therefore, a network capacity of the 5G network needs to be dynamically adjusted during the introduction of the 5G to B industry services to satisfy dynamicity of the 5G to B industry services.

The network capacity is the key to a network or service performance assurance. However, wireless network resources are limited. Therefore, how to dynamically adjust network resources to satisfy requirements of different services on the network capacity becomes the key to 5G network operation and maintenance.

SUMMARY

The embodiments provide a network capacity optimization method and an apparatus, to adjust a network capacity of an area based on a network capacity optimization requirement, so that network capacity performance of the area satisfies a requirement.

The embodiments provide the following solutions.

According to a first aspect, the embodiments provide a network capacity optimization method. The method includes the following steps: a first functional unit obtains network capacity optimization requirement information that includes at least a network capacity optimization target. Network capacity performance that is of an area and that satisfies the network capacity optimization target satisfies a requirement, or the network capacity optimization target is used for a requirement for network capacity performance of a first area. The first functional unit determines a network capacity optimization solution for the first area based on the network capacity optimization requirement information. The network capacity optimization solution is used to address at least a network capacity issue that exists in the first area. The first functional unit optimizes a network capacity of the first area based on the network capacity optimization solution.

Optionally, the network capacity optimization requirement information may further include a network capacity optimization limitation condition in addition to the network capacity optimization target. The network capacity optimization limitation condition is used to describe a determining condition of the network capacity performance of the first area. In other words, the network capacity optimization limitation condition is used to determine whether the network capacity performance of the first area satisfies the network capacity optimization target.

The embodiments provide a network capacity optimization method. In the method, the network capacity optimization requirement information is obtained, where the obtained network capacity optimization requirement information includes at least the network capacity optimization target, and the network capacity optimization target is used to describe the requirement for the network capacity performance of the first area. In other words, the network capacity optimization target carried in the network capacity optimization requirement information in this embodiment indicates a requirement that can be satisfied by the network capacity of the first area and that is expected by an operator or another third party. Therefore, the network capacity optimization solution determined for the first area based on the network capacity optimization target can be used to address at least the network capacity issue that exists in the first area. Therefore, when the network capacity of the first area is subsequently optimized by using the network capacity optimization solution, the network capacity optimization target can be quickly satisfied, that is, the network capacity performance of the area after the optimization is enabled to satisfy the requirement as soon as possible.

In addition, when the network capacity optimization requirement information includes the network capacity optimization limitation condition, it helps learn of the determining condition of the network capacity performance of the first area in time, that is, determine which cells in the first area are high-load cells, load imbalance cells, or the like.

In a possible embodiment, that the first functional unit determines a network capacity optimization solution for the first area based on the network capacity optimization requirement information includes: the first functional unit determines the network capacity optimization solution for the first area when determining, based on the network capacity optimization requirement information, that the network capacity performance of the first area does not satisfy the network capacity optimization target. For example, when obtaining the network capacity optimization requirement information, the first functional unit may first determine whether the network capacity performance of the first area satisfies the network capacity optimization target. The first functional unit determines the network capacity optimization solution for the first area when the network capacity optimization target is not satisfied. The first functional unit may not need to determine the network capacity optimization solution when the network capacity optimization target is satisfied. In this case, the first functional unit may feed back a message indicating that the network capacity of the first area does not need to be optimized. In a possible embodiment, the first functional unit may obtain first information of the first area when the first functional unit obtains the network capacity optimization requirement information, and then the first functional unit determines, based on the first information and the network capacity optimization requirement information, whether the network capacity performance of the first area satisfies the network capacity optimization target.

In a possible implementation, the network capacity optimization solution includes at least the following: identifiers of one or more second network elements in the first area, and one or more of the following parameters corresponding to each of the second network elements: a load balancing function control parameter and/or a handover-related parameter, or the second network element is a network element for which a load balancing function needs to be enabled in the first area. The second network element may be a base station in the first area or may be a cell in the first area. The identifier of the second network element identifies the second network element.

In a possible implementation, the network capacity optimization requirement information is requirement information of the first area in one or more first frequency bands. For example, a frequency band (or a frequency) 1 and a frequency band 2 separately correspond to a piece of network capacity optimization requirement information. In this way, a network capacity optimization solution adapted to each frequency band may be determined for the frequency band based on the network capacity optimization requirement information corresponding to the frequency band, so that a network capacity of the frequency band satisfies a network capacity optimization target of the frequency band as soon as possible.

In a possible implementation, the network capacity optimization target includes one or more of the following information: a first parameter, a second parameter, a third parameter, or a fourth parameter. The first parameter is used to determine a maximum value of a proportion of high-load cells in the first area, and/or the first parameter is used to determine a maximum value of a quantity of high-load cells in the first area. The second parameter is used to determine a maximum value of a proportion of load imbalance cells in the first area, and/or the second parameter is used to determine a maximum value of a quantity of load imbalance cells in the first area. The third parameter is used to determine an average user quantity of each cell in the first area. The fourth parameter is used to determine a throughput of the first area. In this way, the specific content of the requirement information can be clearly defined.

In a possible implementation, when the network capacity optimization requirement information is requirement information of the first area in a plurality of first frequency bands, the network capacity optimization target includes one or more of the following parameters corresponding to each of the first frequency bands: a first parameter, a second parameter, a third parameter, or a fourth parameter. For example, the first parameter corresponding to the first frequency band indicates a maximum value of a proportion of high-load cells in the first area in the first frequency band, and/or the first parameter is used to determine a maximum value of a quantity of high-load cells in the first area in the first frequency band. The second parameter corresponding to the first frequency band indicates a maximum value of a proportion of load imbalance cells in the first area in the first frequency band, and/or the second parameter corresponding to the first frequency band is used to determine a maximum value of a quantity of load imbalance cells in the first area in the first frequency band. The third parameter corresponding to the first frequency band indicates an average user quantity of each cell in the first area in the first frequency band. The fourth parameter corresponding to the first frequency band is used to determine a throughput (which may also be referred to as traffic) of the first area in the first frequency band. The throughput of the first area may be a maximum throughput of the first area.

It should be noted that, the plurality of first frequency bands are different frequency bands when the network capacity optimization requirement information corresponds to the plurality of first frequency bands. For example, the plurality of first frequency bands include the frequency band 1 and the frequency band 2, and the frequency band 1 and the frequency band 2 may separately correspond to one or more of the following parameters: the first parameter, the second parameter, the third parameter, and the fourth parameter.

In a possible implementation, when the network capacity optimization requirement information includes the network capacity optimization limitation condition, the network capacity optimization limitation condition includes one or more of the following information: a first determining condition, a second determining condition, or time information. The first determining condition includes one or more conditions used to determine that a cell is a high-load cell. The second determining condition includes one or more conditions used to determine that a cell is a load imbalance cell. The time information indicates duration for assessing whether the network capacity of the first area satisfies the network capacity optimization target. In this way, it is beneficial to determining that a cell that satisfies the first determining condition is the high-load cell, and a cell that satisfies the second determining condition is the load imbalance cell.

In a possible implementation, when the network capacity optimization requirement information is the requirement information of the first area in the plurality of first frequency bands, the network capacity optimization limitation condition includes one or more of a first determining condition and a second determining condition that correspond to each first frequency band.

In a possible implementation, the first determining condition includes one or more of the following: A physical resource block usage rate of a cell is greater than or equal to a first threshold (for example, a first physical resource block high-load threshold), an average user quantity of a cell is greater than or equal to a second threshold (for example, a first user quantity high-load threshold), a radio resource control connected user quantity of a cell is greater than or equal to a third threshold (for example, a first RRC connected user quantity high-load threshold), or an available capacity of a cell is greater than or equal to a fourth threshold (for example, an available capacity high-load threshold).

In a possible implementation, the second determining condition includes one or more of the following: a difference between physical resource block usage rates of neighboring cells is greater than or equal to a fifth threshold (for example, a physical resource block imbalance threshold), a difference between average user quantities of neighboring cells is greater than or equal to an active-user quantity imbalance threshold, a radio resource control connected user quantity of a neighboring cell is greater than or equal to a sixth threshold (for example, a radio resource control connected user quantity imbalance threshold), or an available capacity of a neighboring cell is less than or equal to a seventh threshold (for example, an available capacity imbalance threshold).

In a possible implementation, when the network capacity optimization requirement information corresponds to the plurality of first frequency bands, the network capacity optimization limitation condition further includes a determining condition (such as a third determining condition) of load imbalance cells in the plurality of first frequency bands, and the third determining condition is used to determine the load imbalance cells in the plurality of first frequency bands. For example, the third determining condition may include one or more conditions for determining the load imbalance cells in the plurality of first frequency bands. For example, the third determining condition may include one or more of the following: a difference between physical resource block usage rates of neighboring cells in the plurality of first frequency bands is greater than or equal to an eighth threshold (for example, a specified physical resource block imbalance threshold); a difference between average user quantities of neighboring cells in the plurality of first frequency bands is greater than or equal to a ninth threshold (for example, a specified active-user quantity imbalance threshold); radio resource control connected user quantities of neighboring cells in the plurality of first frequency bands are greater than or equal to a tenth threshold (for example, a specified radio resource control connected user quantity imbalance threshold); or available capacities of neighboring cells in the plurality of first frequency bands are greater than or equal to an eleventh threshold (for example, a specified available capacity imbalance threshold).

In a possible implementation, when the network capacity optimization requirement information corresponds to the plurality of first frequency bands, the first determining condition includes one or more of the following: a physical resource block usage rate of a cell in each of the first frequency bands is greater than or equal to a first threshold, an average user quantity of a cell in each of the first frequency bands is greater than or equal to a second threshold, a radio resource control connected user quantity of a cell in each of the first frequency bands is greater than or equal to a third threshold, or an available capacity of a cell in each of the first frequency bands is greater than or equal to a fourth threshold. For example, for any one of the first frequency bands, if a physical resource block usage rate of a cell of a cell in the first frequency band is greater than or equal to the first threshold, the cell may be considered as a high-load cell in the first frequency band.

In a possible implementation, when the network capacity optimization requirement information corresponds to the plurality of first frequency bands, the second determining condition includes one or more of the following: a difference between physical resource block usage rates of neighboring cells in each of the first frequency bands is greater than or equal to a fifth threshold, a difference between average user quantities of neighboring cells in each of the first frequency bands is greater than or equal to an active-user quantity imbalance threshold, a radio resource control connected user quantity of a neighboring cell in each of the first frequency bands is greater than or equal to a sixth threshold, or an available capacity of a neighboring cell in each of the first frequency bands is less than or equal to a seventh threshold. For example, if a difference between physical resource block usage rates of a cell 1 and a cell 2 in the first frequency band is greater than or equal to the fifth threshold, the cell 1 and the cell 2 may be considered as load imbalance cells in the first frequency band.

In a possible implementation, that the first functional unit determines a network capacity optimization solution for the first area based on the network capacity optimization requirement information includes: the first functional unit obtains, based on the network capacity optimization requirement information, first data used to determine at least a root cause of a network capacity issue that exists in the first area. The first functional unit determines, based on the first data, the root cause of the network capacity issue that occurs in the first area. The first functional unit determines the network capacity optimization solution for the first area based on the root cause of the network capacity issue that occurs in the first area.

In a possible implementation, that the first functional unit obtains first data based on the network capacity optimization requirement information includes: the first functional unit determines a data collection rule based on the network capacity optimization requirement information. The data collection rule includes one or more of the following information: identifiers of one or more first network elements in the first area, a data type of network element data, and a network element data collection periodicity, where the one or more first network elements are network elements that provide the network element data. The first functional unit collects, as the first data, network element performance data and configuration data from each of the one or more first network elements according to the data collection rule. The data type indicates a type of the network element data obtained from the one or more first network elements. The network element performance data includes one or more of the following information: a cell PRB usage rate, an average user quantity of a cell, and a cell RRC-connected user quantity. The configuration data includes one or more of the following information corresponding to the network element: a load balancing function configuration parameter, a neighbor relationship, or grid information. That the first functional unit determines, based on the first data, the root cause of the network capacity issue that occurs in the first area includes: the first functional unit determines, based on the first data, the network capacity issue that exists in the first area. The first functional unit analyzes the network capacity issue that exists in the first area, to obtain the root cause of the network capacity issue.

In a possible implementation, the method provided further includes: the first functional unit determines a network capacity optimization policy for the first area based on the network capacity optimization requirement information. The network capacity optimization policy includes one or more of the following: a network capacity issue root cause analysis policy and a network capacity optimization adjustment policy. Correspondingly, that the first functional unit determines, based on the first data, the root cause of the network capacity issue that occurs in the first area includes: the first functional unit determines, based on the network capacity issue root cause analysis policy and the first data, the root cause of the network capacity issue that occurs in the first area. The network capacity optimization adjustment policy is used to reflect a sequence of adjusting the load balancing function control parameter and the handover-related parameter that are of the second network element during network capacity optimization.

In a possible implementation, that the first functional unit determines the network capacity optimization solution for the first area based on the root cause of the network capacity issue that occurs in the first area includes: the first functional unit determines, based on the root cause of the network capacity issue that occurs in the first area, one or more solutions for addressing the network capacity issue for the first area. The first functional unit determines an assessment result of each solution for addressing the network capacity issue. The assessment result of the solution for addressing the network capacity issue is used to reflect one or more of the following parameters corresponding to the solution for addressing the network capacity issue: user experience, whether the network capacity optimization target is satisfied, and an adjustment cost. The first functional unit uses, based on the assessment result of each solution for addressing the network capacity issue, an optimal solution for addressing the network capacity issue in the one or more solutions for addressing the network capacity issue as the network capacity optimization solution. The network capacity optimization solution includes at least the following: identifiers of the one or more second network elements for which load balancing functions need to be enabled in the first area, and one or more of the following parameters corresponding to the one or more second network elements: load balancing function control parameters and handover-related parameters.

It should be noted that, when the network capacity optimization adjustment policy is obtained, the first functional unit adjusts, based on a sequence, of adjusting a load balancing function control parameter and a handover-related parameter that are of the second network element during network capacity optimization, reflected in the network capacity optimization adjustment policy, one or more of the following parameters corresponding to the second network elements: load balancing function control parameters and handover-related parameters.

Alternatively, when a single solution for addressing the network capacity issue is determined for the first area, the solution for addressing the network capacity issue may be directly used as the network capacity optimization solution. Alternatively, when a single solution for addressing the network capacity issue is determined for the first area, the solution may be assessed. If an assessment result indicates that a requirement is not satisfied (for example, the assessment result indicates that using the solution for addressing the network capacity issue causes one or more of the following cases: The user experience is lower than a preset user experience threshold, the network capacity optimization target cannot be satisfied, and the adjustment cost is higher than a preset adjustment cost threshold), the first functional unit may update the solution for addressing the network capacity issue, so that the following indicators corresponding to the updated solution for addressing the network capacity issue satisfy a requirement: the user experience is greater than or equal to the preset user experience threshold, the network capacity optimization target is satisfied, and the adjustment cost is less than or equal to the preset adjustment cost threshold. In this way, the first functional unit may determine the updated solution for addressing the network capacity issue as the network capacity optimization solution.

In a possible implementation, the network capacity optimization solution includes at least the following: identifiers of one or more second network elements, and one or more of the following parameters corresponding to the one or more second network elements: load balancing function control parameters and handover-related parameters. The second network element is a network element for which a load balancing function needs to be enabled. That the first functional unit optimizes a network capacity of the first area based on the network capacity optimization solution includes: the first functional unit adjusts load balancing function control parameters and/or handover-related parameters that are of the one or more second network elements in the first area based on the network capacity optimization solution, where the handover-related parameter includes a handover failure rate.

In a possible implementation, after the first functional unit optimizes the network capacity of the first area based on the network capacity optimization solution, the method further includes: the first functional unit determines first information corresponding to the first area. The first information includes one or more of the following information: a first quantity of high-load cells, a first quantity of load imbalance cells, a first proportion of high-load cells, or a first proportion of load imbalance cells. The first functional unit sends the first information. This helps a receiver that receives the first information determine current network capacity performance of the first area after the optimization.

In a possible implementation, the method provided further includes: the first functional unit determines first information corresponding to the first area. The first information includes one or more of the following information: a first quantity of high-load cells, a first quantity of load imbalance cells, a first proportion of high-load cells, and a first proportion of load imbalance cells. The first functional unit determines, based on the first information and the network capacity optimization target, whether the network capacity performance of the first area satisfies the network capacity optimization target. The first functional unit sends second information. The second information indicates whether the network capacity of the first area satisfies the network capacity optimization target. This helps a receiver that receives the second information determine whether the network capacity performance of the first area after the optimization satisfies the network capacity optimization target.

In a possible implementation, the first information includes one or more of the following information corresponding to each second frequency band: a first quantity of high-load cells, a first quantity of load imbalance cells, a first proportion of high-load cells, and a first proportion of load imbalance cells. In this way, whether a network capacity corresponding to each frequency band satisfies a network capacity optimization target of the frequency band may be determined.

In a possible implementation, that the first functional unit determines first information corresponding to the first area includes: the first functional unit collects network capacity performance data of any cell in the first area from one or more network elements in the first area. The network capacity performance data includes one or more of the following information: a physical resource block usage rate of a cell, an average user quantity of a cell, a radio resource control connected user quantity of a cell, and an available capacity of a cell. The first functional unit determines, based on the network capacity optimization limitation condition and the network capacity performance data of the any cell, the first information corresponding to the first area.

In a possible implementation, before the first functional unit sends the first information corresponding to the first area, the method provided in this embodiment further includes: the first functional unit receives third information used to describe a network capacity performance monitoring requirement of the first area. The third information includes one or more of the following information: a target network capacity performance indicator, used to describe a network capacity performance indicator that needs to be monitored; and a network capacity performance monitoring limitation condition, used to describe a condition for the network capacity performance indicator that needs to be monitored. This helps a receiver that receives the third information determine which indicators of the first area are to be monitored.

In a possible implementation, the target network capacity performance indicator includes one or more of the following information: a quantity of high-load cells, a proportion of high-load cells, a quantity of load imbalance cells, or a proportion of load imbalance cells. The network capacity performance monitoring limitation condition includes one or more of the following information: information about a third frequency band, indicating a condition for monitoring the network capacity performance indicator in the third frequency band; second time information, used to describe duration for monitoring or reporting the network capacity performance indicator; and address information, used to describe an address for reporting the network capacity performance indicator. Providing the information about the third frequency band helps determine to monitor the network capacity performance indicator in the third frequency band. The second time information helps determine an interval or a specific moment at which the network capacity performance indicator is monitored or reported. The address information helps determine an object that feeds back the network capacity performance indicator.

In a possible implementation, before the first functional unit determines the network capacity optimization solution for the first area based on the network capacity optimization requirement information, the method provided further includes: the first functional unit determines a management object of the network capacity optimization requirement information; and configures the network capacity optimization requirement information in the management object.

In a possible implementation, the method may further include: the first functional unit allocates a first identifier to the network capacity optimization requirement information, where the first identifier is associated with an identifier of the management object, or the first identifier is the same as the identifier of the management object.

Because the network capacity optimization solution includes at least the identifiers of one or more second network elements for which load balancing functions need to be enabled in the first area, when the network capacity of the first area is subsequently optimized, the load balancing functions of the second network elements may be enabled based on the identifiers of the one or more second network elements. In addition, the second network element may be a base station. In this way, a load balancing function may be introduced for the base station, to achieve load balancing between a plurality of cells of one base station, and achieve a highest radio resource usage rate in the base station.

According to a second aspect, the embodiments provide a network capacity optimization method. The method includes the following steps: a second functional unit determines network capacity optimization requirement information. The network capacity optimization requirement information includes a network capacity optimization target and a network capacity optimization limitation condition, or the network capacity optimization requirement information includes a network capacity optimization target. The network capacity optimization target is used to describe a requirement for the network capacity performance of the first area, and the network capacity optimization limitation condition is used to describe a determining condition of the network capacity performance of the first area. The second functional unit sends a first request message, where the first request message includes the network capacity optimization requirement information, and the first request message is used to request to optimize a network capacity of the first area based on the network capacity optimization requirement information. For example, the second functional unit may send the first request message to the first functional unit.

In a possible implementation, the network capacity optimization requirement information is requirement information of the first area in one or more first frequency bands. In other words, different frequency bands each correspond to a piece of network capacity optimization requirement information.

For related specific content of the network capacity optimization target and the network capacity optimization limitation condition in the second aspect, refer to the descriptions in the first aspect. Details are not described herein again.

In a possible implementation, the method further includes: the second functional unit sends a second request message. The second request message is used to request to monitor/report a network capacity performance indicator of the first area based on third information (which may also be referred to as network capacity performance monitoring information). The third information includes one or more of the following information: a target network capacity performance indicator, used to describe a network capacity performance indicator that needs to be monitored; or a network capacity performance monitoring limitation condition, used to describe a condition for the network capacity performance indicator that needs to be monitored.

In a possible implementation, the method further includes: before the second functional unit sends the second request message, the method may further include: the second functional unit determines third information of the first area. The third information is used to describe a network capacity performance monitoring requirement of the first area.

In a possible implementation, the target network capacity performance indicator includes one or more of the following information: a quantity of high-load cells, a proportion of high-load cells, a quantity of load imbalance cells, or a proportion of load imbalance cells. The network capacity performance monitoring limitation condition includes one or more of the following information: information about a third frequency band, indicating a condition for monitoring the network capacity performance indicator in the third frequency band; second time information, used to describe duration for monitoring or reporting the network capacity performance indicator; and address information, used to describe an address for monitoring or reporting the network capacity performance indicator.

In a possible implementation, the method further includes: the second functional unit receives first information corresponding to the first area. The first information includes one or more of the following information: a first quantity of high-load cells, a first quantity of load imbalance cells, a first proportion of high-load cells, or a first proportion of load imbalance cells. The second functional unit adjusts the network capacity optimization requirement information based on the first information and the network capacity optimization target. In an implementation, that the second functional unit adjusts the network capacity optimization requirement information based on the first information and the network capacity optimization target includes: the second functional unit determines, based on the first information, whether the network capacity performance of the first area satisfies the network capacity optimization target. The second functional unit adjusts the network capacity optimization requirement information based on a determining result of whether the network capacity performance of the first area satisfies the network capacity optimization target.

In a possible implementation, the method further includes: the second functional unit receives information about one or more second frequency bands, where correspondingly, the first information includes one or more of the following information corresponding to each of the second frequency bands: a first quantity of high-load cells, a first quantity of load imbalance cells, a first proportion of high-load cells, or a first proportion of load imbalance cells.

In a possible implementation, the method further includes: the second functional unit receives second information used to determine whether the network capacity of the first area satisfies the network capacity optimization target. The second functional unit adjusts the network capacity optimization requirement information based on the second information. For example, when the second information indicates that the network capacity of the first area does not satisfy the network capacity optimization target, the second functional unit increases a maximum value of a proportion of high-load cells/a maximum value of a proportion of load imbalance cells in the network capacity optimization target. When the second information indicates that the network capacity of the first area satisfies the network capacity optimization target, the second functional unit decreases a maximum value of a proportion of high-load cells/a maximum value of a proportion of load imbalance cells in the network capacity optimization target.

In a possible implementation, that the second functional unit determines network capacity optimization requirement information includes: the second functional unit receives network capacity optimization requirement information that is of the first area and that is entered by a user; and/or the second functional unit receives service requirement information of one or more services in the first area, where the service requirement information includes one or more of the following information: a service type, a service traffic model, or a quantity of terminals that access the service. The second functional unit obtains, through calculation, the network capacity optimization requirement information of the first area based on the service requirement information of the one or more services.

In a possible implementation, the network capacity optimization requirement information includes the network capacity optimization target. That the second functional unit determines the network capacity optimization requirement information includes: the second functional unit adjusts a first network capacity optimization target based on fourth information in the first area and the network capacity intention satisfaction information, to obtain the network capacity optimization target, where the fourth information includes one or more of the following information corresponding to the first area: a first quantity of high-load cells, a first quantity of load imbalance cells, a first proportion of high-load cells, or a first proportion of load imbalance cells. The network capacity intention satisfaction information indicates whether the network capacity of the first area satisfies the first network capacity optimization target. The first network capacity optimization target is an optimization target corresponding to the first area before the network capacity of the first area is optimized based on the network capacity optimization requirement information. The network capacity intention satisfaction information may be obtained by the second functional unit from the first functional unit, or the network capacity intention satisfaction information may be obtained by the second functional unit based on the fourth information in the first area and the first network capacity optimization target.

In a possible implementation, that the second functional unit determines the network capacity optimization limitation condition of the first area includes: the second functional unit obtains performance indicator information of all cells or some cells in the first area. The second functional unit determines the network capacity optimization limitation condition of the first area based on the performance indicator information of all the cells or the some cells in the first area, where the performance indicator information of the cell includes one or more of the following information: a cell PRB usage rate, an average user quantity of a cell, a cell RRC-connected user quantity, or an available capacity of a cell.

According to a third aspect, an embodiment provides a communication apparatus. The communication apparatus can implement the method in any one of the first aspect or the possible implementations of the first aspect, and therefore can further implement the effects in any one of the first aspect or the possible implementations of the first aspect. The communication apparatus may be a first functional network element, or may be an apparatus, for example, a chip used in the first functional network element, that supports the first functional network element in implementing the method in any one of the first aspect or the possible implementations of the first aspect. The communication apparatus may implement the foregoing method by software or hardware, or by executing corresponding software by hardware.

In an example, an embodiment provides a communication apparatus. The communication apparatus includes a communication module and a processing module. The communication module is configured to perform a receiving/sending step. The processing module is configured to perform a processing step. For example, the communication module is configured to obtain network capacity optimization requirement information that includes at least a network capacity optimization target. The network capacity optimization target is used to describe a requirement for network capacity performance of a first area. The processing module is configured to determine a network capacity optimization solution for the first area based on the network capacity optimization requirement information. The network capacity optimization solution is used to address at least a network capacity issue that exists in the first area. The processing module is further configured to optimize a network capacity of the first area based on the network capacity optimization solution.

Optionally, the network capacity optimization requirement information may further include a network capacity optimization limitation condition in addition to the network capacity optimization target. The network capacity optimization limitation condition is used to describe a determining condition of the network capacity performance of the first area.

In a possible embodiment, the processing unit is configured to determine the network capacity optimization solution for the first area when it is determined, based on the network capacity optimization requirement information, that the network capacity of the first area does not satisfy the network capacity optimization target.

In a possible implementation, the network capacity optimization solution includes at least the following: identifiers of one or more second network elements in the first area, and one or more of the following parameters corresponding to each of the second network elements: a load balancing function control parameter and/or a handover-related parameter, and the one or more second network elements are network elements for which load balancing functions need to be enabled in the first area. The second network element may be a base station in the first area or may be a cell in the first area. The identifier of the second network element identifies the second network element.

In a possible implementation, the network capacity optimization requirement information is requirement information of the first area in one or more first frequency bands.

In a possible implementation, for related content of the network capacity optimization target and the network capacity optimization limitation condition in the third aspect, refer to related descriptions in the first aspect. Details are not described herein again.

In a possible implementation, the processing module is configured to obtain, based on the network capacity optimization requirement information by using the communication module, first data used to determine at least a root cause of the network capacity issue that exists in the first area. The processing module is configured to determine, based on the first data, the root cause of the network capacity issue that occurs in the first area. The processing module is configured to determine the network capacity optimization solution for the first area based on the root cause of the network capacity issue that occurs in the first area. The network capacity optimization solution includes at least one or more solutions for addressing the network capacity issue.

In a possible implementation, the processing module is configured to determine a data collection rule based on the network capacity optimization requirement information. The data collection rule includes one or more of the following information: identifiers of one or more first network elements in the first area, a data type of network element data, and a network element data collection periodicity, where the one or more first network elements are network elements that provide the network element data. The processing module is configured to collect network element performance data and configuration data from each of the one or more first network elements according to the data collection rule by using the communication module. The processing module is configured to collect, as the first data, the network element performance data and the configuration data from each of the one or more first network elements. The data type indicates a type of network element data obtained from the one or more first network elements. The network element performance data includes one or more of the following information: a cell PRB usage rate, an average user quantity of a cell, or a cell RRC-connected user quantity. The configuration data includes one or more of the following information corresponding to the network element: a load balancing function configuration parameter, a neighbor relationship, or grid information. The processing module is configured to: determine, based on the first data, the network capacity issue that exists in the first area, and analyze the network capacity issue that exists in the first area, to obtain the root cause of the network capacity issue.

In a possible implementation, the processing module is further configured to determine a network capacity optimization policy for the first area based on the network capacity optimization requirement information. The network capacity optimization policy includes one or more of the following: a network capacity issue root cause analysis policy or a network capacity optimization adjustment policy. Correspondingly, that the processing module determines, based on the first data, the root cause of the network capacity issue that occurs in the first area includes: the processing module is configured to determine, based on the network capacity issue root cause analysis policy and the first data, the root cause of the network capacity issue that occurs in the first area.

In a possible implementation, when the network capacity optimization solution includes a plurality of solutions for addressing the network capacity issue, the processing module is further configured to determine, based on the root cause of the network capacity issue that occurs in the first area, one or more solutions for addressing the network capacity issue for the first area. A first functional unit determines an assessment result of each solution for addressing the network capacity issue. The assessment result of the solution for addressing the network capacity issue is used to reflect one or more of the following parameters corresponding to the solution for addressing the network capacity issue: user experience, whether the network capacity optimization target is satisfied, and an adjustment cost. The processing module is further configured to use, based on the assessment result of each solution for addressing the network capacity issue, an optimal solution for addressing the network capacity issue in the one or more solutions for addressing the network capacity issue as the network capacity optimization solution. The network capacity optimization solution includes at least the following: identifiers of the one or more second network elements for which load balancing functions need to be enabled in the first area, and one or more of the following parameters corresponding to the one or more second network elements: load balancing function control parameters and handover-related parameters.

In a possible implementation, the network capacity optimization solution includes at least the following: identifiers of one or more second network elements, and one or more of the following parameters corresponding to the one or more second network elements: load balancing function control parameters and handover-related parameters. The second network element is a network element for which a load balancing function needs to be enabled. The processing module is configured to adjust load balancing function control parameters and/or handover-related parameters that are of the one or more second network elements in the first area based on the network capacity optimization solution, where the handover-related parameter includes a handover failure rate.

In a possible implementation, the processing module is further configured to determine first information corresponding to the first area, where the first information includes one or more of the following information: a first quantity of high-load cells, a first quantity of load imbalance cells, a first proportion of high-load cells, or a first proportion of load imbalance cells. The communication module is configured to send the first information.

In a possible implementation, the processing module is further configured to determine first information corresponding to the first area. The first information includes one or more of the following information: a first quantity of high-load cells, a first quantity of load imbalance cells, a first proportion of high-load cells, or a first proportion of load imbalance cells. The processing module is further configured to determine, based on the first information and the network capacity optimization target, whether the network capacity of the first area satisfies the network capacity optimization target. The communication module is configured to send second information. The second information is used to determine whether the network capacity of the first area satisfies the network capacity optimization target.

In a possible implementation, the first information includes one or more of the following information corresponding to each second frequency band: a first quantity of high-load cells, a first quantity of load imbalance cells, a first proportion of high-load cells, or a first proportion of load imbalance cells. In this way, whether a network capacity corresponding to each frequency band satisfies a network capacity optimization target of the frequency band may be determined.

In a possible implementation, the processing module is configured to collect network capacity performance data of any cell in the first area from one or more network elements in the first area by using the communication module. The network capacity performance data includes one or more of the following information: a physical resource block usage rate of a cell, an average user quantity of a cell, a radio resource control connected user quantity of a cell, or an available capacity of a cell. The processing module is configured to determine, based on the network capacity optimization limitation condition and the network capacity performance data of the any cell, the first information corresponding to the first area.

In a possible implementation, the communication module is further configured to receive third information used to describe a network capacity performance monitoring requirement of the first area. The third information includes one or more of the following information: a target network capacity performance indicator, used to describe a network capacity performance indicator that needs to be monitored; and a network capacity performance monitoring limitation condition, used to describe a condition for the network capacity performance indicator that needs to be monitored. This helps a receiver that receives the third information determine which indicators of the first area are to be monitored.

In a possible implementation, the target network capacity performance indicator includes one or more of the following information: a quantity of high-load cells, a proportion of high-load cells, a quantity of load imbalance cells, or a proportion of load imbalance cells. The network capacity performance monitoring limitation condition includes one or more of the following information: information about a third frequency band, indicating a condition for monitoring the network capacity performance indicator in the third frequency band; second time information, used to describe duration for monitoring or reporting the network capacity performance indicator; and address information, used to describe an address for reporting the network capacity performance indicator. Providing the information about the third frequency band helps determine to monitor the network capacity performance indicator in the third frequency band. The second time information helps determine an interval or a specific moment at which the network capacity performance indicator is monitored or reported. The address information helps determine an object that feeds back the network capacity performance indicator.

In a possible implementation, the processing module is further configured to: determine a management object of the network capacity optimization requirement information, and configure the network capacity optimization requirement information in the management object.

In a possible implementation, the method application may further include: the first functional unit allocates a first identifier to the network capacity optimization requirement information. The first identifier is associated with an identifier of the management object, or the first identifier is the same as the identifier of the management object.

For example, when the communication apparatus is a chip or a chip system in the first functional unit, the processing module may be a processor, and the communication module may be a communication interface. For example, the communication interface may be an input/output interface, a pin, a circuit, or the like. The processing module executes instructions stored in a storage module, to enable the first functional unit to implement the network capacity optimization method described in any one of the first aspect or the possible implementations of the first aspect. The storage module may be a storage module (for example, a register or a cache) in the chip, or may be a storage module (for example, a read-only memory or a random access memory) that is in the first functional unit and that is located outside the chip.

According to a fourth aspect, an embodiment provides a communication apparatus. The communication apparatus can implement the method in any one of the second aspect or the possible implementations of the second aspect, and therefore can further implement the beneficial effects in any one of the second aspect or the possible implementations of the second aspect. The communication apparatus may be a second functional network element, or may be an apparatus, for example, a chip used in the second functional network element, that supports the second functional network element in implementing the method in any one of the second aspect or the possible implementations of the second aspect. The communication apparatus may implement the foregoing method by software or hardware, or by executing corresponding software by hardware.

In an example, an embodiment provides a communication apparatus. The communication apparatus includes a communication module and a processing module. The communication module is configured to perform a receiving/sending step. The processing module is configured to perform a processing step. For example, the processing module is configured to determine network capacity optimization requirement information. The network capacity optimization requirement information includes a network capacity optimization target and a network capacity optimization limitation condition, or the network capacity optimization requirement information includes a network capacity optimization target, where the network capacity optimization target is used to describe a requirement for network capacity performance of a first area. The network capacity optimization limitation condition is used to describe a determining condition of the network capacity performance of the first area. The communication module is configured to send a first request message, where the first request message includes the network capacity optimization requirement information, and the first request message is used to request to optimize a network capacity of the first area based on the network capacity optimization requirement information. For example, the communication module is configured to send the first request message to a first functional unit.

In a possible implementation, the network capacity optimization requirement information is requirement information of the first area in one or more first frequency bands. In other words, different frequency bands possibly each correspond to one piece of network capacity optimization requirement information.

For related specific content of the network capacity optimization target and the network capacity optimization limitation condition in the fourth aspect, refer to the descriptions in the first aspect. Details are not described herein again.

In a possible implementation, the communication module is further configured to send a second request message, where the second request message is used to request to monitor/report a network capacity performance indicator of the first area based on third information. The third information includes one or more of the following information: a target network capacity performance indicator, used to describe a network capacity performance indicator that needs to be monitored; or a network capacity performance monitoring limitation condition, used to describe a condition for the network capacity performance indicator that needs to be monitored.

In a possible implementation, before a second functional unit sends the second request message, the method provided may further include: the second functional unit determines the third information used to describe a network capacity performance monitoring requirement of the first area.

In a possible implementation, the target network capacity performance indicator includes one or more of the following information: a quantity of high-load cells, a proportion of high-load cells, a quantity of load imbalance cells, or a proportion of load imbalance cells. The network capacity performance monitoring limitation condition includes one or more of the following information: information about a third frequency band, indicating a condition for monitoring the network capacity performance indicator in the third frequency band; second time information, used to describe duration for monitoring or reporting the network capacity performance indicator; or address information, used to describe an address for monitoring or reporting the network capacity performance indicator.

In a possible implementation, the communication module is further configured to receive first information corresponding to the first area, where the first information includes one or more of the following information: a first quantity of high-load cells, a first quantity of load imbalance cells, a first proportion of high-load cells, or a first proportion of load imbalance cells; and the second functional unit adjusts the network capacity optimization requirement information based on the first information.

In a possible implementation, the communication module is further configured to receive information about one or more second frequency bands. Correspondingly, the first information includes one or more of the following information corresponding to each of the second frequency bands: a first quantity of high-load cells, a first quantity of load imbalance cells, a first proportion of high-load cells, or a first proportion of load imbalance cells.

In a possible implementation, the communication module is further configured to receive second information, where the second information is used to determine whether the network capacity of the first area satisfies the network capacity optimization target. The processing module is configured to adjust the network capacity optimization requirement information based on the second information. For example, when the second information indicates that the network capacity of the first area does not satisfy the network capacity optimization target, the processing module is configured to increase a maximum value of a proportion of high-load cells/a maximum value of a proportion of load imbalance cells in the network capacity optimization target. When the second information indicates that the network capacity of the first area satisfies the network capacity optimization target, the processing module is configured to decrease a maximum value of a proportion of high-load cells/a maximum value of a proportion of load imbalance cells in the network capacity optimization target.

In a possible implementation, that the processing module is configured to determine network capacity optimization requirement information includes: the processing module is configured to receive, through the communication module, network capacity optimization requirement information that is of the first area and that is entered by a user; and/or the processing module is configured to receive, through the communication module, service requirement information of one or more services in the first area, where the service requirement information includes one or more of the following information: a service type, a service traffic model, and a quantity of terminals that access the service; and the processing module is configured to obtain, through calculation, the network capacity optimization requirement information of the first area based on the service requirement information of the one or more services.

In a possible implementation, the network capacity optimization requirement information includes the network capacity optimization target. That the processing module is configured to determine network capacity optimization requirement information includes: the processing module is configured to adjust a first network capacity optimization target based on fourth information in the first area and network capacity intention satisfaction information, to obtain the network capacity optimization target, where the fourth information includes one or more of the following information corresponding to the first area: a first quantity of high-load cells, a first quantity of load imbalance cells, a first proportion of high-load cells, or a first proportion of load imbalance cells. The network capacity intention satisfaction information indicates whether the network capacity of the first area satisfies the first network capacity optimization target. The first network capacity optimization target is an optimization target corresponding to the first area before the network capacity of the first area is optimized based on the network capacity optimization requirement information.

In a possible implementation, that the processing module is configured to determine the network capacity optimization limitation condition of the first area includes: the processing module is configured to obtain performance indicator information of all cells or some cells in the first area by using the communication module. The second functional unit determines the network capacity optimization limitation condition of the first area based on the performance indicator information of all the cells or the some cells in the first area, where the performance indicator information of the cell includes one or more of the following information: a cell PRB usage rate, an average user quantity of a cell, a cell RRC-connected user quantity, or an available capacity of a cell.

For example, when the communication apparatus is a chip or a chip system in the second functional unit, the processing module may be a processor, and the communication module may be a communication interface. For example, the communication interface may be an input/output interface, a pin, a circuit, or the like. The processing module executes instructions stored in a storage module, to enable the second functional unit to implement the network capacity optimization method described in any one of the second aspect or the possible implementations of the second aspect. The storage module may be a storage module (for example, a register or a cache) in the chip, or may be a storage module (for example, a read-only memory or a random access memory) that is in the second functional unit and that is located outside the chip.

According to a fifth aspect, an embodiment provides a non-transitory computer-readable storage medium. The non-transitory computer-readable storage medium stores a computer program or instructions. When the computer program or the instructions are run on a computer, the computer is enabled to perform the network capacity optimization method described in any one of the first aspect or the possible implementations of the first aspect.

According to a sixth aspect, an embodiment provides a non-transitory computer-readable storage medium. The non-transitory computer-readable storage medium stores a computer program or instructions. When the computer program or the instructions are run on a computer, the computer is enabled to perform the network capacity optimization method described in any one of the second aspect or the possible implementations of the second aspect.

According to a seventh aspect, an embodiment provides a computer program product including instructions. When the computer program product runs on a computer, the computer is enabled to perform the network capacity optimization method described in any one of the first aspect or the possible implementations of the first aspect.

According to an eighth aspect, an embodiment provides a computer program product including instructions. When the computer program product runs on a computer, the computer is enabled to perform the network capacity optimization method described in any one of the second aspect or the possible implementations of the second aspect.

According to a ninth aspect, an embodiment provides a communication apparatus, configured to implement the method in any one of the first aspect, the second aspect, or the possible implementations of the first aspect or the second aspect. The communication apparatus may be the foregoing first functional unit, an apparatus that includes the first functional unit, or a component (for example, a chip) used in the first functional unit. Alternatively, the communication apparatus may be the foregoing second functional unit, an apparatus that includes the second functional unit, or the communication apparatus may be a component (for example, a chip) used in the second functional unit. The communication apparatus includes a corresponding module or unit for implementing the foregoing method. The module or unit may be implemented by hardware or software, or by executing corresponding software by hardware. The hardware or the software includes one or more modules or units corresponding to the foregoing functions.

According to a tenth aspect, an embodiment provides a communication apparatus. The communication apparatus includes at least one processor and a communication interface. When the communication apparatus runs, the processor executes computer-executable instructions or a program stored in the communication apparatus, to enable the communication apparatus to perform the method in any one of the possible implementations in any aspect of the first aspect. For example, the communication apparatus may be a first functional unit, or a component used in the first functional unit.

According to an eleventh aspect, an embodiment provides a communication apparatus. The communication apparatus includes at least one processor and a communication interface. When the communication apparatus runs, the processor executes computer-executable instructions or a program stored in the communication apparatus, to enable the communication apparatus to perform the method in any one of the possible implementations in any aspect of the second aspect. For example, the communication apparatus may be a second functional unit, or a component used in the second functional unit.

It should be understood that the communication apparatus described in the tenth aspect and the eleventh aspect may further include a bus and a memory, and the memory is configured to store code and data. Optionally, the at least one processor, the communication interface, and the memory are coupled to one another.

According to a twelfth aspect, an embodiment provides a communication apparatus. The communication apparatus includes at least one processor. The at least one processor is coupled to a memory. When the communication apparatus runs, the processor executes computer-executable instructions or a program stored in the memory, to enable the communication apparatus to perform the method in any one of the first aspect or the possible implementations of the first aspect. For example, the communication apparatus may be a first functional unit, or a chip used in the first functional unit.

According to a thirteenth aspect, an embodiment provides a communication apparatus. The communication apparatus includes at least one processor. The at least one processor is coupled to a memory. When the communication apparatus runs, the processor executes computer-executable instructions or a program stored in the memory, to enable the communication apparatus to perform the method in any one of the second aspect or the possible implementations of the second aspect. For example, the communication apparatus may be a second functional unit, or a chip used in the second functional unit.

It should be understood that the memory described in either of the twelfth aspect and the thirteenth aspect may alternatively be replaced with a storage medium. This is not limited in embodiments. In a possible implementation, the memory described in either of the twelfth aspect and the thirteenth aspect may be a memory inside the communication apparatus. Further, the memory may alternatively be located outside the communication apparatus. However, the at least one processor can still execute the computer-executable instructions or the program stored in the memory.

According to a fourteenth aspect, an embodiment provides a communication apparatus. The communication apparatus includes one or more modules, configured to implement the method according to either of the first aspect and the second aspect. The one or more modules may correspond to the steps in the method according to the first aspect or the second aspect.

According to a fifteenth aspect, an embodiment provides a chip, where the chip includes a processor and a communication interface. The communication interface is coupled to the processor. The processor is configured to run a computer program or instructions, to implement the network capacity optimization method described in the first aspect or the possible implementations of the first aspect. The communication interface is configured to communicate with another module other than the chip.

According to a sixteenth aspect, an embodiment provides a chip, where the chip includes a processor and a communication interface. The communication interface is coupled to the processor. The processor is configured to run a computer program or instructions, to implement the network capacity optimization method described in any one of the second aspect or the possible implementations of the second aspect. The communication interface is configured to communicate with another module other than the chip.

For example, the chip provided in this embodiment further includes a memory, configured to store the computer program or the instructions.

According to a seventeenth aspect, an embodiment provides a communication system, where the communication system includes a first functional unit and a second functional unit. The first functional unit is configured to implement the method described in any one of the first aspect or the possible implementations of the first aspect. The second functional unit is configured to implement the method described in any one of the second aspect or the possible implementations of the second aspect. Alternatively, the first functional unit is the communication apparatus described in any one of the third aspect or the possible implementations of the third aspect. The second functional unit is the communication apparatus described in any one of the fourth aspect or the possible implementations of the fourth aspect.

In a possible embodiment, the communication system may further include one or more network elements, and the one or more network elements are configured to provide network capacity performance data of the network elements.

Any apparatus, computer storage medium, computer program product, chip, or communication system provided above is configured to perform the corresponding method provided above. Therefore, for effects that can be achieved by the apparatus, computer storage medium, computer program product, chip, or communication system, refer to beneficial effects of a corresponding solution in the corresponding method provided above. Details are not described herein again.

DETAILED DESCRIPTION OF EMBODIMENTS

Figure 1:
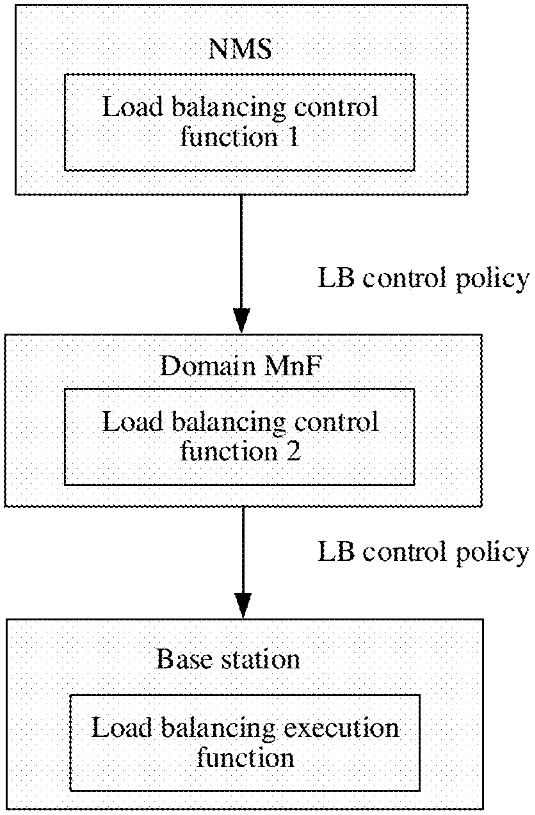
FIG. 1 is a schematic diagram of a network capacity optimization method in a conventional technology.

To clearly describe the solutions in embodiments, terms such as "first" and "second" are used to distinguish between same items or similar items that provide basically same functions or purposes. For example, first information and second information are merely used to distinguish between different information, and do not limit a sequence of the first information and the second information. A person skilled in the art may understand that terms such as "first" and "second" do not limit a quantity or an execution sequence, and terms such as "first" and "second" do not indicate a definite difference.

It should be noted that terms such as "an example" or "for example" are used to represent giving an example, an illustration, or a description. Any embodiment or design scheme described as an "example" or "for example" should not be explained as being more preferred or having more advantages than another embodiment or design scheme. Exactly, use of the term "example", "for example", or the like is intended to present a related concept in a specific manner.

In the embodiments, at least one means one or more, and a plurality of means two or more. The term "and/or" describes an association relationship between associated objects, and represents that three relationships may exist. For example, A and/or B may represent the following cases: only A exists, both A and B exist, and only B exists, where A and B may be singular or plural. The character "/" generally indicates an "or" relationship between the associated objects. At least one of the following items (pieces) or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

Before the embodiments are described, related terms are first explained as follows:

(1) Management object: used to describe information about a specific management object or a specific management task in a management system, where a management object information model may be used as an interaction parameter in a management interface, and creating the management object indicates creating management information in the management system, so that the management system can manage the management object or perform the management task based on the management information.

(2) Cell: a radio coverage area identified by a base station identity code or a cell global identity, where one base station serves one or more cells.

(3) Grid: A grid structure is the simplest and most direct spatial data structure, and means that the earth surface is divided into evenly-sized grid box arrays with close proximity, where as a pixel, each grid box is defined by a row and a column, and includes a code indicating an attribute type or value of the pixel, or includes only a pointer pointing to an attribute record of the pixel. Therefore, the grid structure is a data organization in which a regular array is used to represent spatial clutter or phenomenon distribution, and each piece of data in the organization represents a non-geometric attribute feature of a clutter or a phenomenon.

(4) Frequency band: a continuous frequency between two specified limit frequencies. Note: The frequency band is represented by two values (for example, an upper limit frequency and a lower limit frequency) that specify a position of the frequency band in a spectrum, or described by an intermediate value of the two values.

FIG. 1 shows a network capacity optimization method in a conventional technology. Currently, a load balancing function (LBF) is introduced for a base station, to implement a load balance between a plurality of cells of one base station, and achieve highest radio resource usage efficiency in the base station. A load balancing control function 2 (load balance control function 1) is introduced on a domain management unit side, to coordinate load balancing functions of different base stations (base stations managed by a domain management function (Domain MnF)), and generate a control policy (including a switch of the load balance function, an RRC setup failure rate, a handover success rate, and the like) of each base station. A load balancing control function 1 (load balance control function 1) is introduced on a cross-domain management unit (domain Management Function), to coordinate load balancing functions of different base stations (base stations managed by different Domain MnFs), and generate a control policy (including a switch of the load balancing function (LBF), an RRC setup failure rate, a handover success rate, and the like) of each base station.

However, in the foregoing technology, operation and maintenance personnel of an operator needs to separately set a control policy of each base station between many frequency bands and cells, including optimizing mobility-related parameters such as handover/reselection or enabling a load balancing algorithm based on expert experience. However, as user traffic increases, a quantity of frequency bands deployed in a network increases gradually, and a quantity of cells also increases. In addition, LBF policies of different cells of different base stations affect each other. Consequently, it is difficult to achieve optimal capacity performance of a plurality of cells of a plurality of base stations and achieve an expected capacity target of the operator.

Figure 2:
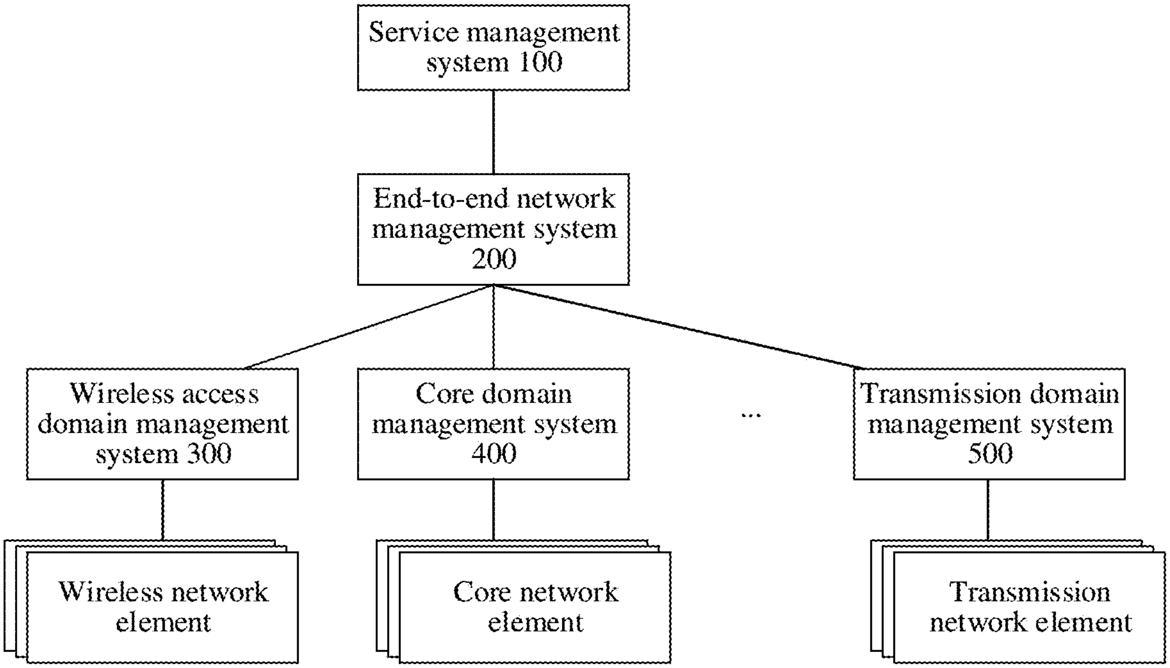
FIG. 2 is a schematic diagram of a system architecture according to an embodiment.

FIG. 2 shows a system architecture according to an embodiment. The architecture includes a service management system 100, an end-to-end network management system (NMS) 200, one or more domain management systems (DMS), and one or more network elements corresponding to the domain management systems.

For example, the one or more domain management systems include a radio access domain management system 300, a core domain management system 400, a transmission domain management system 500, and the like.

The service management system 100 provides a service operation function, including functions such as service provisioning, service assurance, service scheduling, and user management, and includes a service operation system of a vertical industry or a service operation system of an operator (for example, a service support system or a communication service management function).

The end-to-end network management system 200 provides an end-to-end network operation and maintenance function, including an end-to-end network life cycle management function, a configuration management function, a fault management function, a performance management function, an intention management function, an intelligent analysis function, and the like. A network in embodiments may include one or more network elements or subnets.

The domain management system provides a subnet operation and maintenance function and a network element operation and maintenance function for a specific domain, including a subnet or network element life cycle management function, a configuration management function, a fault management function, a performance management function, an intention management function, an intelligent analysis function, and the like. The specific domain in the embodiments may be a technology domain, for example, a radio access domain, a core domain, a transmission domain, or the like, where a network operation and maintenance system architecture may include a radio access domain management system, a core domain management system, and a transmission domain management system; may be a vendor domain, for example, one vendor domain for one vendor, for example, a vendor 1 domain or a vendor 2 domain; or may be a vendor+technology domain, for example, a radio access domain of a vendor 1 and a radio access domain of a vendor 2.

The network element refers to an entity that provides a network service, and may be classified into a wireless network element (for example, a base station, a base station centralized control unit (CUCP), a base station central unit (CU), a base station distributed unit (DU), and a base station centralized user plane unit (CUUP), a core network element (for example, an access management function (AMF) network element, a session management function (SMF) network element, or a network data analytics function (NWDAF)), and a transmission network element (for example, a gateway). The base station in embodiments may be, for example, a next generation NodeB (gNB).

Figure 3:
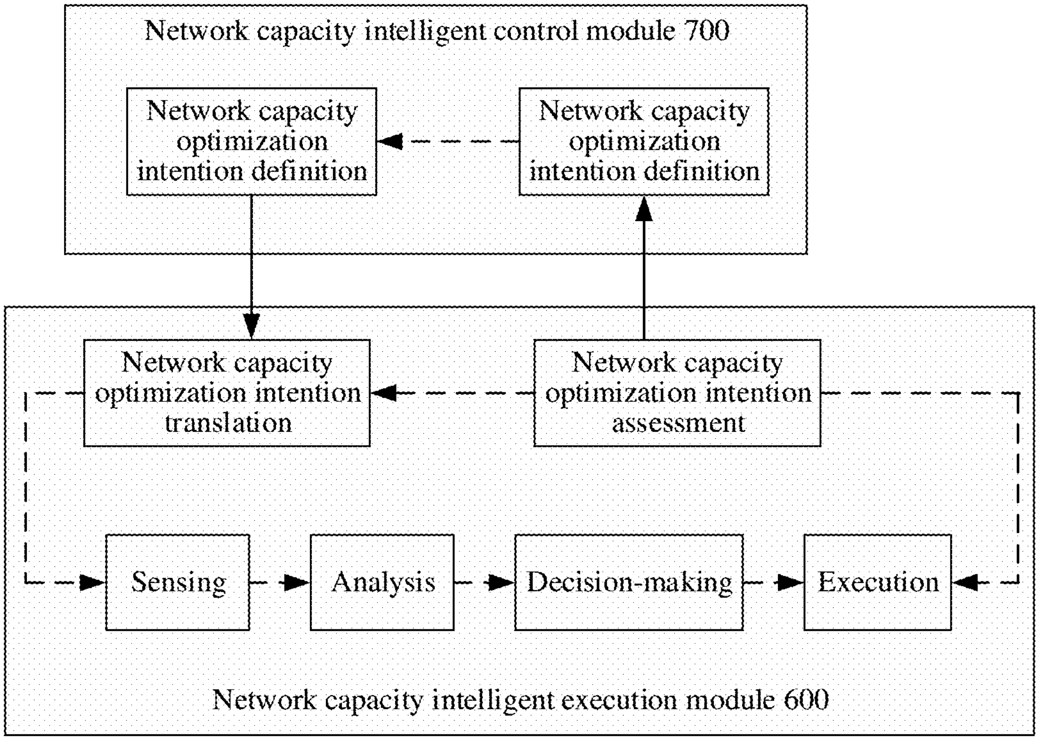
FIG. 3 is a schematic diagram of a communication system according to an embodiment.

FIG. 3 shows a communication system according to an embodiment. The communication system includes a network capacity intelligent execution module 600 and a network capacity intelligent control module 700. The network capacity intelligent execution module 600 communicates with the network capacity intelligent control module 700 through a logical interface.

The network capacity intelligent execution module 600 includes the following management capabilities:

- network capacity optimization intention translation, for example, converting a network capacity optimization intention (including a network capacity optimization target and a network capacity optimization limitation condition) into a specific action or policy;
- implementing a closed-loop network capacity optimization procedure, including network capacity sensing (including network capacity-related data collection), analysis (including network capacity issue identification, demareation, and root cause analysis), decision-making (including network capacity adjustment or configuration solution decision-making), and execution (network capacity adjustment or configuration solution execution); and
- network capacity optimization intention assessment, which is to assess whether a network capacity optimization intention is satisfied.

The network capacity intelligent control module 700 includes the following management capabilities: network capacity optimization intention definition, for example, determining or adjusting the network capacity optimization target and the network capacity optimization limitation condition; and network capacity optimization intention monitoring, for example, monitoring a satisfaction status of the network capacity optimization intention.

The network capacity intelligent execution module 600 and the network capacity intelligent control module 700 in this embodiment have the following several deployment scenarios:

- Deployment scenario 1: The network capacity intelligent execution module 600 is implemented by the domain management system shown in FIG. 2, and the network capacity intelligent control module 700 is implemented by the end-to-end network management system 200 shown in FIG. 2.
- Deployment scenario 2: The network capacity intelligent execution module 600 is implemented by a network element (for example, a transmission network element, a core network element, or a wireless network element), and the network capacity intelligent control module 700 is implemented by the domain management system shown in FIG. 2.

In a service-based management architecture, the network capacity intelligent control module 700 is a management service consumer, and the network capacity intelligent execution module 600 is a management service provider. The logical interface is a network capacity optimization management service or a network capacity intention management service.

Figure 4:
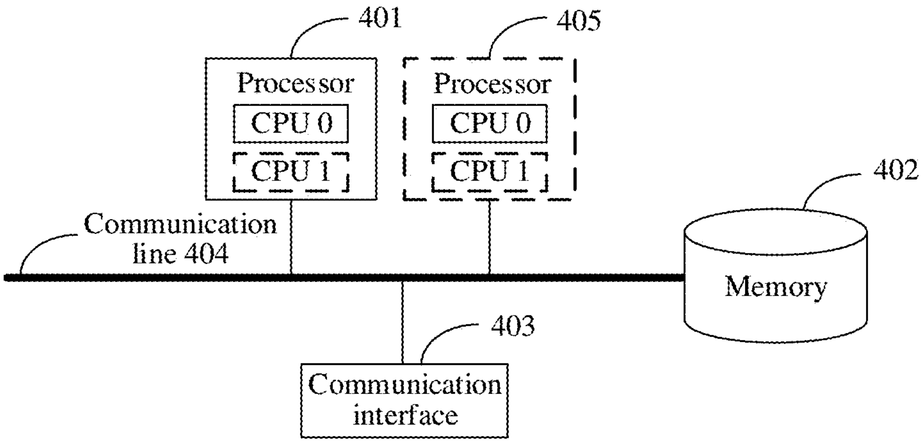
FIG. 4 is a schematic diagram of a structure of a communication apparatus according to an embodiment.

FIG. 4 is a schematic diagram of a structure of a communication apparatus according to an embodiment. For a structure of a first functional unit/second functional unit in this embodiment, refer to the structure of the communication apparatus. As shown in FIG. 4, the communication apparatus includes a processor 401, a communication line 404, and at least one communication interface (a communication interface 403 is used as an example for description in FIG. 4).

The processor 401 may be a general-purpose central processing unit (CPU), a microprocessor, an application-specific integrated circuit (ASIC), or one or more integrated circuits configured to control program execution of the solutions in the embodiments.

The communication line 404 may include a path for information transmission between the foregoing components.

The communication interface 403 is configured to exchange information with another apparatus by using, for example, any type of apparatus like a transceiver, and is configured to communicate with another device or a communication network, for example, an Ethernet, a radio access network (RAN), or a wireless local area network (WLAN).

Optionally, the communication apparatus may further include a memory 402.

The memory 402 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer. However, this is not limited thereto. The memory may exist independently, and is connected to the processor by using the communication line 404. The memory may alternatively be integrated with the processor.

The memory 402 is configured to store computer-executable instructions for performing the solutions of the embodiments, and the processor 401 controls the performing. The processor 401 is configured to execute the computer-executable instructions stored in the memory 402, to implement a network capacity optimization method provided in the following embodiments.

Optionally, the computer-executable instructions in this embodiment may also be referred to as application program code. This is not limited in this embodiment.

During specific implementation, in an embodiment, the processor 401 may include one or more CPUs such as a CPU 0 and a CPU 1 in FIG. 4.

During specific implementation, in an embodiment, the communication apparatus may include a plurality of processors, for example, the processor 401 and a processor 405 in FIG. 4. Each of the processors may be a single-core (single-CPU) processor, or may be a multi-core (multi-CPU) processor. The processor herein may be one or more devices, circuits, and/or processing cores configured to process data (for example, computer program instructions).

In this embodiment, a specific structure of an execution body of a network capacity optimization method is not limited, provided that communication can be performed according to the network capacity optimization method in this embodiment by running a program that records code of the network capacity optimization method in this embodiment. For example, the execution body of the network capacity optimization method provided in this embodiment may be a functional module that can invoke and execute a program in the first functional unit, or may be a communication apparatus, for example, a chip, used in the first functional unit. The execution body of the network capacity optimization method provided in this embodiment may be a functional module that can invoke and execute a program in a second functional unit, or may be a communication apparatus, for example, a chip, used in the second functional unit. This is not limited. The following embodiments are described by using an example in which execution bodies of the network capacity optimization method are the first functional unit and the second functional unit.

Figure 5:
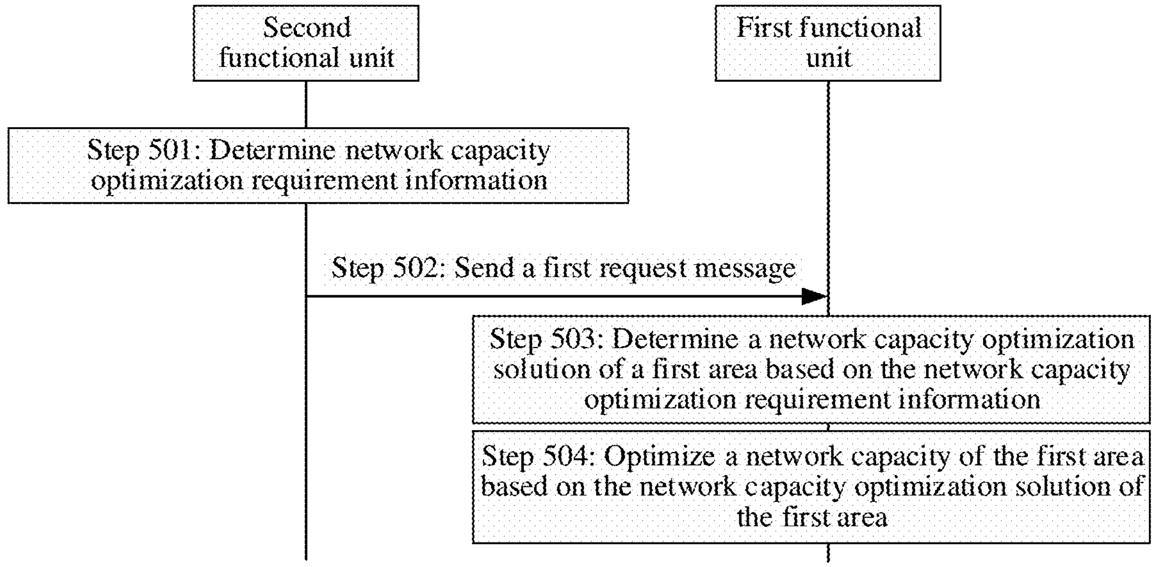
FIG. 5 is a schematic flowchart of interaction in a network capacity optimization method according to an embodiment.

FIG. 5 is a schematic diagram of interaction in a network capacity optimization method according to an embodiment. The method includes the following steps.

Step 501: A second functional unit determines network capacity optimization requirement information. The network capacity optimization requirement information includes a network capacity optimization target and a network capacity optimization limitation condition, or the network capacity optimization requirement information includes a network capacity optimization target. Alternatively, the network capacity optimization requirement information includes a network capacity optimization limitation condition.

Network capacity performance that is of an area and that satisfies the network capacity optimization target satisfies a requirement. In other words, the network capacity optimization target is used to measure whether the network capacity performance of an area satisfies a requirement. In other words, the network capacity optimization target is used to describe a requirement for the network capacity performance of a first area. In other words, the network capacity optimization target enables a network capacity of a first area to be optimal or network capacity performance to be optimized. In other words, the network capacity optimization target is a target that can be achieved by a network capacity of a first area and that is expected by an operator or a third party. In some embodiments, when a network capacity of an area satisfies the network capacity optimization target, the network capacity performance of the area satisfies the requirement, or the network capacity is optimal. If a network capacity of an area does not reach the network capacity optimization target, the network capacity performance of the area does not satisfy the requirement.

The network capacity optimization requirement information in this embodiment may also be referred to as a network capacity optimization intention or a network capacity optimization task. In an example, the network capacity optimization requirement information includes one or more of the following: a network capacity optimization target and a network capacity optimization limitation condition.

In an example, the network capacity optimization target may include one or more parameters. When network capacity performance of an area satisfies the requirement, the one or more parameters are a proportion of high-load cells, a quantity of high-load cells, a quantity of load imbalance cells, a proportion of load imbalance cells, a throughput of the first area, and an average user quantity of each cell in the first area that correspond to the area.

For example, the network capacity optimization target includes one or more of the following information: a first parameter, a second parameter, a third parameter, and a fourth parameter. The first parameter is used to determine a maximum value of a proportion of high-load cells in the first area, and/or the first parameter is used to determine a maximum value of a quantity of high-load cells in the first area. The second parameter is used to determine a maximum value of a proportion of load imbalance cells in the first area, and/or the second parameter is used to determine a maximum value of a quantity of load imbalance cells in the first area. The third parameter is used to determine an average user quantity of each cell in the first area. The fourth parameter is used to determine a throughput of the first area.

The maximum value of the proportion of high-load cells in the first area is used to limit the maximum value of the quantity of high-load cells in the first area, that is, a maximum proportion of the quantity of high-load cells in the first area in a total quantity of cells in the first area. In other words, to enable the network capacity of the first area to satisfy the requirement, the maximum proportion of the quantity of high-load cells in the first area in the total quantity of cells in the first area is less than or equal to the maximum value of the proportion of high-load cells in the first area.

In an implementation, the first parameter may be the maximum value of the proportion of high-load cells in the first area. Alternatively, the first parameter may be a maximum value of a proportion of other cells than the high-load cells in the first area. Alternatively, the first parameter may be the maximum value of the quantity of high-load cells in the first area and the total quantity of cells in the first area.

For example, there are a total of 100 cells in the first area, that is, the total quantity of cells is 100. A maximum of 30 cells can exist as the high-load cells in the first area if the maximum value of the proportion of high-load cells is 30%.

The maximum value of the proportion of load imbalance cells is used to limit the maximum value of the quantity of load imbalance cells in the first area, that is, a maximum proportion of the quantity of load imbalance cells in the first area in a total quantity of cells in the first area. In other words, to enable the network capacity of the first area to satisfy the requirement, the maximum proportion of the quantity of load imbalance cells in the first area in the total quantity of cells in the first area is less than or equal to the maximum value of the proportion of load imbalance cells in the first area.

In an implementation, the second parameter may be the maximum value of the proportion of load imbalance cells in the first area. Alternatively, the first parameter may be a maximum value of a proportion of other cells than the load imbalance cells in the first area. Alternatively, the first parameter may be the maximum value of the quantity of load imbalance cells in the first area and the total quantity of cells in the first area.

For example, there are a total of 100 cells in the first area, and the proportion of load imbalance cells is 20%. In this case, a maximum quantity of load imbalance cells in the first area is 20. If a pair of neighboring cells (for example, a cell A and a cell B are neighboring cells) have load imbalance, the cell A and the cell B are load imbalance cells.

The average user quantity is an average of quantities of terminals that access all cells in the first area. For example, the first area includes a cell 1 and a cell 2. The average user quantity of the first area may be an average of a quantity of terminals that access the cell 1 and a quantity of terminals that access the cell 2, or the average user quantity may be a maximum value of a quantity of terminals that can perform access in the first area.

The throughput of the first area may refer to a sum of throughputs of all the cells in the first area. For example, the network capacity of the first area satisfies the requirement if the sum of the throughputs of all the cells in the first area is greater than or equal to the throughput of the first area.

The network capacity optimization limitation condition describes a determining condition of the network capacity performance of the first area, or the network capacity optimization limitation condition is used to determine whether the network capacity performance of the area satisfies the network capacity optimization target. For example, the network capacity optimization limitation condition includes one or more of the following information: a first determining condition, a second determining condition, and time information. The first determining condition includes one or more conditions used to determine that a cell is a high-load cell. In other words, the first determining condition is used to determine whether a cell in the first area is the high-load cell. The second determining condition includes one or more conditions used to determine that a cell is a load imbalance cell. In other words, the second determining condition is used to determine whether a cell in the first area is the load imbalance cell. The time information indicates duration for assessing whether the network capacity of the first area satisfies the network capacity optimization target. For example, the time information may indicate a time period T1 for assessing whether the network capacity of the first area satisfies the network capacity optimization target, or the time information may indicate a periodicity of assessing whether the network capacity of the first area satisfies the network capacity optimization target.

In an example, the first determining condition includes at least one of the following: a cell physical resource block (PRB) usage rate is greater than or equal to a first threshold (for example, a first PRB high-load threshold); an average user quantity of a cell is greater than or equal to a second threshold (for example, a first user quantity high-load threshold); a radio resource control (RRC) connected user quantity of a cell is greater than or equal to a third threshold (for example, a first RRC connected user quantity high-load threshold); and an available capacity of a cell is greater than or equal to a fourth threshold (for example, an available capacity high-load threshold). In other words, if a parameter of any cell satisfies any one or more conditions in the first determining condition, the cell may be considered as the high-load cell.

In an example, the second determining condition includes at least one of the following: a difference between PRB usage rates of neighboring cells is greater than or equal to a fifth threshold (for example, a PRB imbalance threshold), a difference between average user quantities of neighboring cells is greater than or equal to an active-user quantity imbalance threshold, an RRC connected user quantity of a neighboring cell is greater than or equal to a sixth threshold (for example, an RRC connected user quantity imbalance threshold), and an available capacity of a neighboring cell is less than or equal to a seventh threshold (for example, an available capacity imbalance threshold). In other words, if a parameter of any neighboring cell satisfies any one or more conditions in the second determining condition, the neighboring cell may be considered as the load imbalance cell.

The first area in this embodiment may include one or more network devices (for example, base stations), and each of the base stations may cover one or more cells. This is not limited in this embodiment. When the first area covers one base station, it may be considered that a network capacity of the one or more cells covered by the base station is optimized.

In an optional embodiment, when a network capacity performance indicator of the first area does not satisfy a preset network capacity performance indicator, the second functional unit determines that the network capacity of the first area needs to be optimized, and therefore can determine the network capacity optimization requirement information. Alternatively, when detecting an optimization instruction, the second functional unit determines that the network capacity of the first area needs to be optimized. For example, if the second functional unit is implemented by an end-to-end network management system, a service management system may send the optimization instruction to the second functional unit, where the optimization instruction is used to instruct to optimize the network capacity of the first area. Optionally, the optimization instruction may carry the network capacity optimization requirement information. For example, if the second functional unit is implemented by a domain management system, the service management system may send the optimization instruction to the second functional unit through an end-to-end network management system 200.

When the second functional unit is implemented by the domain management system or the end-to-end network management system 200, because one domain management system or the end-to-end network management system 200 may manage a plurality of areas, the optimization instruction may further include information about the first area, so that the second functional unit determines an area to which the network capacity optimization requirement information is applicable.

In another aspect, that the second functional unit determines that the network capacity performance indicator of the first area does not satisfy the preset network capacity performance indicator may be implemented in the following manner: The second functional unit obtains, from a first functional unit, a parameter (for example, a proportion of high-load cells/a quantity of high-load cells or a quantity/proportion of load imbalance cells) used to reflect the network capacity performance indicator of the first area. Then, the second functional unit compares the parameter with the preset network capacity performance indicator, and then the second functional unit determines, based on a comparison result, whether the network capacity performance indicator of the first area satisfies the preset network capacity performance indicator. Alternatively, in still another aspect, the first functional unit compares the network capacity performance indicator of the first area with the preset network capacity performance indicator to obtain a comparison result, and then the first functional unit feeds back the comparison result to the second functional unit. In this way, the second functional unit may determine, based on the comparison result, whether the network capacity performance indicator of the first area satisfies the preset network capacity performance indicator.

In this embodiment, that the second functional unit obtains, from a first functional unit, a parameter used to reflect the network capacity performance indicator of the first area may be implemented in the following manner: the second functional unit requests the first functional unit to report the network capacity performance indicator of the first area. The first functional unit reports, to the second functional unit based on a request of the second functional unit, a monitored parameter used to reflect the network capacity performance indicator of the first area. Alternatively, the first functional unit actively reports, or reports, when a reporting periodicity is satisfied, to the second functional unit, the parameter used to reflect the network capacity performance indicator of the first area.

It should be noted that the first area may be one area, or may include a plurality of sub-areas. This is not limited in this embodiment. When the first area includes a plurality of sub-areas, if the network capacity optimization requirement information is associated with the plurality of sub-areas, it indicates that the network capacity optimization requirement information is applicable to the plurality of sub-areas. If the network capacity optimization requirement information includes respective network capacity optimization requirement sub-information of the sub-areas, each sub-area is applicable to network capacity optimization requirement sub-information associated with the sub-area. That is, in this case, the network capacity optimization requirement information of the first area includes network capacity optimization requirement sub-information of the plurality of sub-areas.

The second functional unit in this embodiment is a unit configured to manage at least network capacity optimization of the first area. For example, the second functional unit in this embodiment may be the network capacity intelligent control module 700 shown in FIG. 3.

Step 502: The second functional unit sends a first request message to the first functional unit, and correspondingly, the first functional unit receives the first request message from the second functional unit.

The first request message includes the network capacity optimization requirement information. The first request message is used to request the first functional unit to optimize the network capacity of the first area based on the network capacity optimization requirement information of the first area. In this way, the optimized network capacity of the first area can satisfy the network capacity optimization requirement information of the first area as much as possible.

In an example, the first request message may further include a first indication, and the first indication indicates the first functional unit to optimize the network capacity of the first area based on the network capacity optimization requirement information of the first area.

In an example, the first request message further includes an identifier of the first area, so that the first functional unit determines an area or areas to which the network capacity optimization requirement information is applicable. For example, the first request message may include information about an area 1, information about an area 2, and the network capacity optimization requirement information. In this way, the first functional unit may determine that the network capacity optimization requirement information is applicable to the area 1 and the area 2. Alternatively, the first request message may include {information about an area 1, network capacity optimization requirement information 1} and {information about an area 2, network capacity optimization requirement information 2}. In this way, an execution module may determine that the network capacity optimization requirement information 1 is applicable to the area 1, and the network capacity optimization requirement information 2 is applicable to the area 2. It should be noted that network capacity optimization requirement information of different areas may be carried in different messages. This is not limited in this embodiment.

In an example, the first request message may be a network capacity optimization intention management request. For example, the network capacity optimization intention management request may be any one of a network capacity optimization intention create request and a network capacity optimization intention modify request. The network capacity optimization intention create request may be a request sent for the first time to adjust a network capacity of a specific area. For example, when the first functional unit optimizes a network capacity of the area 1 based on network capacity optimization requirement information A in a phase I, but the optimized network capacity of the area 1 does not satisfy the network capacity optimization target, or because a network capacity requirement of a same area changes at different moments (it is assumed that a network capacity requirement of the area 1 changes in a phase II), the second functional unit may send network capacity optimization requirement information B to the first functional unit through the network capacity optimization intention modify request in the phase II. It should be noted that, in this case, content of the network capacity optimization requirement information B is different from content of the network capacity optimization requirement information A.

In an example, there is a logical interface between the second functional unit and the first functional unit, and the second functional unit and the first functional unit communicate with each other through the logical interface.

In an example, the logical interface may be a communication interface dedicated to adjusting a network capacity between the second functional unit and the first functional unit. In other words, there may be a plurality of interfaces (including the logical interface) between the second functional unit and the first functional unit, but only the logical interface is the interface dedicated to adjusting the network capacity between the two functional units. In another example, all communication between the second functional unit and the first functional unit may be implemented through the logical interface.

The first functional unit in this embodiment is a unit configured to adjust at least the network capacity of the first area. As shown in FIG. 3, the first functional unit in this embodiment may be the network capacity intelligent execution module 600.

Step 503: The first functional unit determines a network capacity optimization solution for the first area based on the network capacity optimization requirement information. The network capacity optimization solution is used to address at least a network capacity issue that exists in the first area.

It should be noted that, the network capacity issue is an issue that enables the network capacity performance of the first area not to satisfy the requirement. For example, the proportion of load imbalance cells is greater than or equal to the maximum value of the proportion of load imbalance cells, the proportion of high-load cells is greater than or equal to the maximum value of the proportion of high-load cells, or the quantity of load imbalance cells is greater than or equal to the maximum value of the quantity of load imbalance cells.

Step 504: The first functional unit optimizes the network capacity of the first area based on the network capacity optimization solution for the first area.

In this embodiment, optimizing a network capacity of an area may be considered as adjusting a network resource of the area.

The embodiments provide a network capacity optimization method. In the method, the network capacity optimization requirement information is obtained, where the obtained network capacity optimization requirement information includes at least the network capacity optimization target, and the network capacity optimization target is used to describe the requirement for the network capacity performance of the first area. In other words, the network capacity optimization target carried in the network capacity optimization requirement information in this embodiment indicates a requirement that can be satisfied by the network capacity of the first area and that is expected by an operator or another third party. Therefore, the network capacity optimization solution determined for the first area based on the network capacity optimization target can be used to address at least the network capacity issue that exists in the first area. Therefore, when the network capacity of the first area is subsequently optimized by using the network capacity optimization solution, the network capacity optimization target can be quickly satisfied, that is, the network capacity performance of the area after the optimization is enabled to satisfy the requirement as soon as possible.

In a possible implementation, the network capacity optimization requirement information is requirement information of the first area in one or more first frequency bands. In other words, each of the one or more first frequency bands corresponds to a network capacity optimization target and/or a network capacity optimization limitation condition. Therefore, the first functional unit needs to optimize a network capacity of the first area in each first frequency band when optimizing the network capacity of the first area, so that the network capacity in each first frequency band satisfies a network capacity optimization target corresponding to the first frequency band. Further, network capacity optimization targets corresponding to different first frequency bands may be the same or may be different. For example, a plurality of first frequency bands are a frequency band 1 and a frequency band 2. A maximum value of a proportion of high-load cells corresponding to the frequency band 1 may be greater than a maximum value of a proportion of high-load cells corresponding to the frequency band 2. Similarly, network capacity optimization limitation conditions corresponding to different first frequency bands may be the same or may be different, and may be set based on requirements in an actual process. Network capacities of a same area in different frequency bands all satisfy a requirement by limiting a network capacity optimization target and/or a network capacity optimization limitation condition corresponding to each first frequency band.

It should be noted that each first frequency band corresponds to one or more of the following parameters: a first parameter, a second parameter, a third parameter, and a fourth parameter. For example, the first parameter corresponding to the first frequency band indicates a maximum value of a proportion of high-load cells in the first area in the first frequency band, and/or the first parameter is used to determine a maximum value of a quantity of high-load cells in the first area in the first frequency band. The second parameter corresponding to the first frequency band indicates a maximum value of a proportion of load imbalance cells in the first area in the first frequency band, and/or the second parameter corresponding to the first frequency band is used to determine a maximum value of a quantity of load imbalance cells in the first area in the first frequency band. The third parameter corresponding to the first frequency band indicates an average user quantity of each cell in the first area in the first frequency band. The fourth parameter corresponding to the first frequency band is used to determine a throughput (which may also be referred to as traffic) of the first area in the first frequency band. The throughput of the first area may be a maximum throughput of the first area. For example, a plurality of first frequency bands are different frequency bands. For example, the plurality of first frequency bands include a frequency band 1 and a frequency band 2. In this case, the frequency band 1 and the frequency band 2 may separately correspond to one or more of the following parameters: a first parameter, a second parameter, a third parameter, and a fourth parameter.

In an example, the network capacity optimization target of the first frequency band includes one or more of the following information: a maximum value of a proportion of high-load cells in the first frequency band, a maximum value of a proportion of load imbalance cells in the first frequency band, a maximum value of a proportion of load imbalance cells in the first frequency bands, an average user quantity of a cell in the first frequency band, and a throughput in the first frequency band.

For example, for the maximum value of the proportion of high-load cells in the first frequency band, for example, a maximum value of a proportion of high-load cells in F10M (the frequency band is 10 M), a proportion of a quantity of high-load cells in F10M in a quantity of all cells in F10M in the first area is less than or equal to the maximum value of the proportion of high-load cells in F10M.

In an example, for the maximum value of the proportion of load imbalance cells in the first frequency band, a proportion of a quantity of load imbalance cells in the first frequency band in a quantity of all cells in the first frequency band in the first area is less than or equal to the maximum value of the proportion of load imbalance cells in the first frequency band. For example, there are a total of 100 F10M cells in the first area, where load imbalance exists between 20 F10M cells and F10M cells neighboring to the 20 F10M cells. In this case, the proportion of load imbalance cells in the F10M frequency band is 20%. If a pair of neighboring cells (for example, a cell A and a cell B are neighboring cells and both the cells are F10M cells) have load imbalance, the cell A and the cell B are load imbalance cells in the F10M frequency band. It should be noted that the load imbalance cells may alternatively be load imbalance in two frequency bands.

The maximum value of the proportion of load imbalance cells in the first frequency band is a proportion of a quantity of load imbalance cells in two frequency bands to a quantity of all cells in the two frequency bands in the first frequency band. For example, there are a total of 100 F10M cells and 100 F20M cells in the first area, where load imbalance exists between 20 F10M cells and 20 neighboring F20M cells. In this case, a proportion of load imbalance cells in the F10M cells and the F20M cells is 20%. If a pair of neighboring cells (for example, a cell A and a cell B are neighboring cells, the cell A is an F10M cell, and the cell B is an F20M cell) have load imbalance, the cell A and the cell B are load imbalance cells in an F10M frequency band and an F20M frequency band.

The average user quantity in the first frequency band is an average of quantities of users in all cells, for example, an average of quantities of users in F10M cells, in the first frequency band in the first area.

The throughput in the first frequency band, that is, the throughput in the first frequency band in the first area, may be a sum of throughputs of all cells in the first frequency band in the first area, for example, traffic of the F10M cells.

The network capacity optimization limitation condition of the first frequency band includes a first determining condition of the first frequency band, including at least one of the following: A cell physical resource block PRB usage rate in the first frequency band is greater than or equal to a first PRB high-load threshold; an average user quantity of a cell in the first frequency band is greater than or equal to a first user quantity high-load threshold; a cell radio resource control RRC connected user quantity in the first frequency band is greater than or equal to a first RRC connected user quantity high-load threshold; and an available capacity of a cell in the first frequency band is greater than or equal to a first available capacity high-load threshold. A second determining condition of the first frequency band includes at least one of the following: a difference between PRB usage rates of neighboring cells in the first frequency band is greater than or equal to a PRB imbalance threshold; a difference between average user quantities of neighboring cells in the first frequency band is greater than or equal to an active-user quantity imbalance threshold; an RRC connected user quantity of a neighboring cell in the first frequency band is greater than or equal to an RRC connected user quantity imbalance threshold; and an available capacity of the neighboring cell in the first frequency band is less than or equal to an available capacity imbalance threshold. Determining load imbalance cells in different frequency bands includes at least one of the following: a difference between PRB usage rates of neighboring cells in two frequency bands is greater than or equal to a specified PRB imbalance threshold; a difference between average user quantities of neighboring cells in the two frequency bands is greater than or equal to a specified active-user quantity imbalance threshold; an RRC connected user quantity of a neighboring cell between the two frequency bands is greater than or equal to a specified RRC connected user quantity imbalance threshold; and an available capacity of the neighboring cell between the two frequency bands is greater than or equal to a specified available capacity imbalance threshold.

The neighboring cells in the two frequency bands may mean that a cell 1 in a frequency band 1 and a cell 2 in a frequency band 2 are neighboring cells.

It should be noted that the cell in this embodiment may alternatively be replaced with a grid. For example, the maximum value of the proportion of high-load cells in the network capacity optimization target may alternatively be a maximum value of a proportion of high-load grids. The maximum value of the proportion of load imbalance cells may alternatively be a maximum value of a proportion of load imbalance grids.

For the maximum value of the proportion of high-load grids, a proportion of a quantity of high-load grids in the first area in a total quantity of grids in the first area should be less than or equal to the maximum value of the proportion of high-load grids. For example, there are a total of 100 grids in the first area. A maximum quantity of high-load grids in the first area is 30 if the maximum value of the proportion of high-load grids is 30%. In this embodiment, a proportion of high-load grids in a specific area is determined by a quantity of high-load grids in the area and a total quantity of grids in the area. For example, a proportion of high-load grids in an area=a quantity of high-load grids in the area/a total quantity of grids in the area.

For the maximum value of the proportion of load imbalance grids, a proportion of a quantity of load imbalance grids in the first area in the total quantity of grids in the first area is less than or equal to the maximum value of the proportion of load imbalance grids, or a proportion of a quantity of load imbalance grids in the first area in the total quantity of grids in the first area is less than or equal to the maximum value of the proportion of load imbalance grids. In this embodiment, a proportion of high-load grids in a specific area is determined by a quantity of high-load grids in the area and a total quantity of grids in the area. For example, a proportion of load imbalance grids in an area=a quantity of load imbalance grids in the area/a total quantity of grids in the area. For example, there are a total of 100 grids in the first area. A proportion of load imbalance grids is 20% if a quantity of load imbalance grids in the first area is 20. If a pair of neighboring grids (for example, a grid A and a grid B are neighboring grids) have load imbalance, the grid A and the grid B are load imbalance cells.

In a possible implementation, when the network capacity optimization requirement information corresponds to the plurality of first frequency bands, the network capacity optimization limitation condition further includes a determining condition (such as a third determining condition) of load imbalance cells in the plurality of first frequency bands, and the third determining condition is used to determine the load imbalance cells in the plurality of first frequency bands. For example, the third determining condition may include one or more conditions for determining the load imbalance cells in the plurality of first frequency bands. For example, the third determining condition may include one or more of the following: a difference between physical resource block usage rates of neighboring cells in the plurality of first frequency bands is greater than or equal to an eighth threshold (for example, a specified physical resource block imbalance threshold); a difference between average user quantities of neighboring cells in the plurality of first frequency bands is greater than or equal to a ninth threshold (a specified active-user quantity imbalance threshold); radio resource control connected user quantities of neighboring cells in the plurality of first frequency bands are greater than or equal to a tenth threshold (for example, a specified radio resource control connected user quantity imbalance threshold), and available capacities of neighboring cells in the plurality of first frequency bands are greater than or equal to an eleventh threshold (for example, a specified available capacity imbalance threshold). For example, a difference between physical resource block usage rates of a cell 1 in a frequency band 1 and a cell 2 in a frequency band 2 is a parameter 1. If the parameter 1 is greater than a specified physical resource block imbalance threshold, the cell 1 and the cell 2 may be considered as load imbalance cells in the frequency band 1 and the frequency band 2.

In a possible implementation, when the network capacity optimization requirement information corresponds to the plurality of first frequency bands, the first determining condition includes one or more of the following: a physical resource block usage rate of a cell in each of the first frequency bands is greater than or equal to a first threshold, an average user quantity of a cell in each of the first frequency bands is greater than or equal to a second threshold, a radio resource control connected user quantity of a cell in each of the first frequency bands is greater than or equal to a third threshold, and an available capacity of a cell in each of the first frequency bands is greater than or equal to a fourth threshold. For example, for any one of the first frequency bands, if a physical resource block usage rate of a cell of a cell in the first frequency band is greater than or equal to the first threshold, the cell may be considered as a high-load cell in the first frequency band.

In a possible implementation, when the network capacity optimization requirement information corresponds to the plurality of first frequency bands, the second determining condition includes one or more of the following: a difference between physical resource block usage rates of neighboring cells in each of the first frequency bands is greater than or equal to a fifth threshold, a difference between average user quantities of neighboring cells in each of the first frequency bands is greater than or equal to an active-user quantity imbalance threshold, a radio resource control connected user quantity of a neighboring cell in each of the first frequency bands is greater than or equal to a sixth threshold, and an available capacity of a neighboring cell in each of the first frequency bands is less than or equal to a seventh threshold. For example, if a difference between physical resource block usage rates of a cell 1 and a cell 2 in the first frequency band is greater than or equal to the fifth threshold, the cell 1 and the cell 2 may be considered as load imbalance cells in the first frequency band.

The following separately describes various possible implementations of step 501.

In a possible implementation, step 501 may be implemented in the following manner: the second functional unit detects one or more of a network capacity optimization target and a network capacity optimization limitation condition that are entered by a user (for example, operation and maintenance personnel). For example, the operation and maintenance personnel enters the network capacity optimization requirement information to the second functional unit based on a network planning requirement.

In another possible implementation, step 501 may be implemented in the following manner: the second functional unit obtains service requirement information of one or more services in the first area. The second functional unit obtains, through calculation, the network capacity optimization requirement information of the first area based on the service requirement information of the one or more services. In an example, the service requirement information of the service includes one or more of the following information corresponding to the service: a service type, a service traffic model, and a quantity of users. The quantity of users corresponding to the service is a quantity of terminals that access the service. For example, the second functional unit may obtain the service requirement information from a service management system 100.

In still another possible implementation, step 501 may be implemented in the following manner: the second functional unit obtains the quantity or proportion of high-load cells and the quantity or proportion of load imbalance cells in the first area. The second functional unit determines a network capacity assessment result of the first area based on the quantity or proportion of high-load cells, the quantity or proportion of load imbalance cells, and a first network capacity optimization target in the first area. The second functional unit adjusts a first network capacity optimization target in a first network capacity optimization intention based on the network capacity assessment result of the first area, to obtain the network capacity optimization target. Alternatively, the second functional unit obtains a network capacity assessment result of the first area from the first functional unit. The second functional unit adjusts a first network capacity optimization target in a first network capacity optimization intention based on the network capacity assessment result of the first area, to obtain the network capacity optimization target. The first network capacity optimization intention is a network capacity optimization intention corresponding to the first area before network capacity optimization. The first network capacity optimization target is a network capacity optimization target corresponding to the first area before network capacity optimization.

In an example, that the second functional unit adjusts a first network capacity optimization target based on the network capacity assessment result of the first area, to obtain the network capacity optimization target may be implemented in the following manner: If the network capacity assessment result of the first area indicates that the network capacity of the first area does not satisfy the first network capacity optimization target, the second functional unit re-adjusts the first network capacity optimization target based on the obtained quantity or proportion of high-load cells and the obtained quantity or proportion of load imbalance cells in the first area, to obtain a second network capacity optimization target. (For example, the maximum value of the proportion of high-load cells and the maximum value of the proportion of load imbalance cells are increased.) For another example, if the network capacity assessment result of the first area indicates that the network capacity of the first area satisfies the first network capacity optimization target, and the proportion of high-load cells or the quantity of high-load cells, and the proportion of load imbalance cells or the quantity of load imbalance cells in the first area are far less than the first network capacity optimization target, the second functional unit may adjust the first network capacity optimization target, to obtain a second network capacity optimization target. (For example, the maximum value of the proportion of high-load cells and the maximum value of the proportion of load imbalance cells are decreased.)

In an implementation, that the second functional unit determines a network capacity optimization limitation condition of the first area may be implemented in the following manner.

Step 11: The second functional unit obtains performance indicator information of all cells or some cells (grids) in the first area. The performance indicator information of the cell includes one or more of the following performance indicators: a cell PRB usage rate, an average user quantity of a cell, a cell RRC connected user quantity, and an available capacity of a cell. The average user quantity of the cell is an average quantity of terminals that access the cell in a specific time period. The cell RRC connected user quantity is an average quantity of RRC connected terminals in the cell. The available capacity of the cell is a capacity that is still available and that is of the cell and is equal to a total capacity of the cell minus a used capacity.

It should be noted that the second functional unit may obtain performance indicator information that is of all cells or some cells (grids) of the first area and that is in a first time period. The first time period may be one day, one week, or one month. This is not limited in this embodiment.

In an example, the second functional unit may obtain the performance indicator information of all the cells or the some cells (grids) in the first area from all base stations in the first area. For example, the second functional unit is a radio access domain management system. The second functional unit may notify a wireless network element (for example, a base station) managed by the second functional unit to report performance indicator information of one or more cells, covered by the base station, in the first area. For example, the second functional unit is a core domain management system. The second functional unit may notify a core network element (for example, an AMF network element) corresponding to the first area to report performance indicator information of one or more cells in the first area. In this way, the AMF network element may obtain the performance indicator information of all the cells in the first area from one or more base stations included in the first area.

Step 12: The second functional unit determines the network capacity optimization limitation condition of the first area based on the performance indicator information of all the cells or the some cells in the first area.

For example, the second functional unit may use an average of any performance indicator (a first performance indicator) of all the cells in the first area as a threshold corresponding to the first performance indicator. Alternatively, the second functional unit may use an average of a first performance indicator of cells that are in all the cells in the first area and whose first performance indicator is less than an average of the performance indicator of all the cells in the first area as a threshold corresponding to the first performance indicator. Alternatively, the second functional unit may calculate, based on any performance indicator of cells in the first area and respective weights corresponding to the cells, an average of the performance indicator of all the cells in the first area, and use the obtained average as a threshold corresponding to the first performance indicator.

For example, how the second functional unit determines the first threshold is described by using an example in which the first performance indicator is a cell PRB usage rate. The second functional unit may use an average of cell PRB usage rates of all the cells in the first area as the first threshold. Alternatively, the second functional unit may use an average of PRB usage rates of cells that are in all the cells in the first area and whose PRB usage rates are less than an average of cell PRB usage rates of all the cells in the first area as the first threshold. Alternatively, the second functional unit may calculate, based on cell PRB usage rates of cells in the first area and respective weights corresponding to the cells, an average of cell PRB usage rates of all the cells in the first area, and use the obtained average as the first threshold.

For another example, the second functional unit may determine, based on the obtained performance indicator information of all the cells or the some cells, a threshold of a first performance indicator corresponding to each neighboring cell in all the cells or the some cells. For a specific determining process, refer to the process of determining the threshold of the first performance indicator corresponding to each cell. Details are not described herein again.

Figure 6:
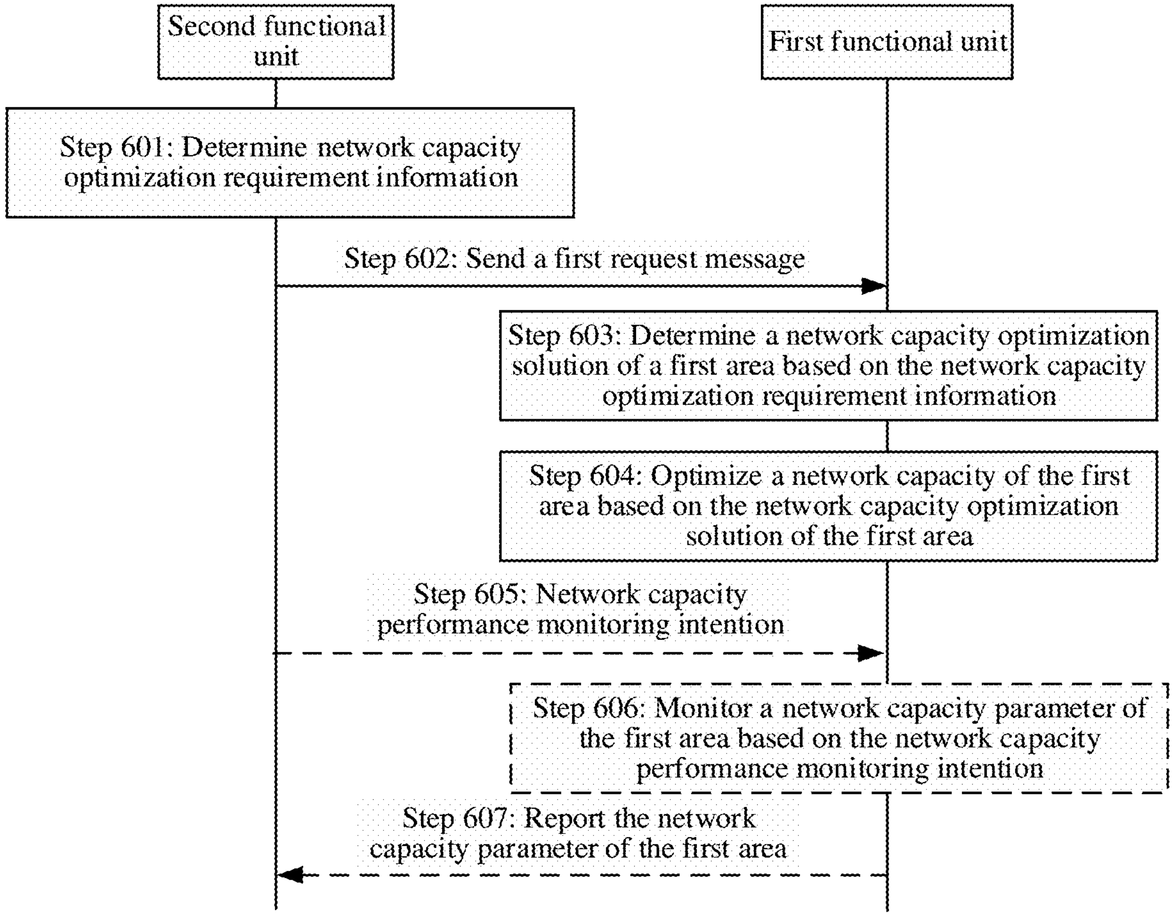
FIG. 6 is a schematic flowchart of interaction in a network capacity optimization method according to an embodiment.

FIG. 6 shows another network capacity optimization method according to the embodiments. In addition to step 601 to step 604 (corresponding to step 501 to step 504), the method may further include the following steps.

Step 605: A second functional unit sends a network capacity performance monitoring intention corresponding to a first area to a first functional unit, and correspondingly, the first functional unit receives the network capacity performance monitoring intention corresponding to the first area from the second functional unit. The network capacity performance monitoring intention corresponding to the first area is used to describe a network capacity performance monitoring requirement of the first area. The network capacity performance monitoring intention may also be referred to as a network capacity performance monitoring task or another name. This is not limited in this embodiment.

In this embodiment, the network capacity performance monitoring intention and the foregoing network capacity optimization requirement information may be carried in a same message. Also, both may alternatively be carried in different messages. For example, the network capacity performance monitoring intention is carried in a second request message. The second request message is used to request the first functional unit to monitor/report a network capacity performance indicator of the first area.

In a possible embodiment, before step 504, the method provided in this embodiment may further include: the second functional unit determines the network capacity performance monitoring intention corresponding to the first area. Correspondingly, the second request message includes the network capacity performance monitoring intention corresponding to the first area. The network capacity performance monitoring intention is used to describe a network capacity performance monitoring requirement of the first area. For example, the network capacity performance monitoring intention includes a target network capacity performance indicator and a network capacity performance monitoring limitation condition. The network capacity performance monitoring intention may also be referred to as the network capacity performance monitoring task, and is used to describe network capacity performance monitoring requirement information, to further control a network capacity intelligent execution module to monitor network capacity performance (including collection and reporting of network capacity performance data) based on the network capacity performance monitoring requirement information.

The target network capacity performance indicator is used to describe a network capacity performance indicator that needs to be monitored by the network capacity intelligent control module, and includes one or more of the following information: a quantity of high-load cells, a proportion of the high-load cells, a quantity of load imbalance cells, and a proportion of the load imbalance cells.

The network capacity performance monitoring limitation condition is used to describe a network capacity performance condition monitored by the first functional unit. For example, the network capacity performance monitoring limitation condition includes one or more of the following information: information about a third frequency band, second time information, and address information. The information about the third frequency band indicates a condition for monitoring a network capacity performance indicator in the third frequency band. For example, if frequency bands indicated by the information about the third frequency band are a frequency band 1 and a frequency band 2, the first functional unit may subsequently monitor network capacity performance indicators of the first area in the frequency band 1 and the frequency band 2.

The second time information may also be referred to as a monitoring or reporting periodicity, and is used to describe a periodicity in which the first functional unit monitors or reports the network capacity performance indicator. For example, the monitoring or reporting periodicity is one day.

The address information may also be referred to as a monitoring or reporting address, and is used to describe an address at which the first functional unit monitors or reports the network capacity performance indicator.

In a possible implementation, first information and a network capacity performance indicator monitoring intention may be carried in a same message. For example, in addition to the first information, a first request message further carries the network capacity performance indicator monitoring intention. Alternatively, in another possible implementation of the embodiments, the first information and the network capacity performance indicator monitoring intention may be carried in different messages.

Step 606: The first functional unit monitors, based on the network capacity performance monitoring intention, a parameter (for example, a quantity of high-load cells, a proportion of the high-load cells, a quantity of load imbalance cells, and a proportion of the load imbalance cells) used to reflect a network capacity of the first area.

It should be noted that, if a network capacity performance monitoring intention indication indicates monitoring but does not indicate reporting, the first functional unit may assess, based on a monitored network capacity parameter and a network capacity optimization target, whether the network capacity of the first area satisfies the network capacity optimization target. The first functional unit may feed back an assessment result to the second functional unit. That is, step 607 is not performed.

The first functional unit may perform step 607 if the network capacity performance monitoring intention indication indicates monitoring and reporting.

Step 607: The first functional unit reports, to the second functional unit based on the network capacity performance monitoring intention, the parameter used to reflect the network capacity of the first area.

For example, the first functional unit monitors the network capacity parameter of the first area within a time range indicated by the second time information, or reports the network capacity parameter of the first area.

For example, the first functional unit monitors the network capacity parameter of the first area in the third frequency band indicated by the information about the third frequency band.

For example, if the target network capacity performance indicator indicates the first functional unit to monitor the proportion of the high-load cells in the first area, the first functional unit obtains performance indicator information of cells in the first area, to determine the proportion of the high-load cells in the first area.

For example, the network capacity performance monitoring intention includes the second time information, and the target network capacity performance indicator includes the proportion of the high-load cells, the proportion of the load imbalance cells, and the information about the third frequency band. In this case, the first functional unit monitors, based on the second time information, the proportion of the high-load cells and the proportion of the load imbalance cells in the first area in the third frequency band.

It should be noted that the second time information may include time information 1 and time information 2, where the time information 1 is a time range for monitoring the network capacity parameter of the first area. The time information 2 is a range for reporting the network capacity parameter of the first area. Alternatively, the second time information indicates to report the monitored parameter immediately after the network capacity parameter of the first area is monitored within a second time range or report the monitored parameter within a preset time period.

It should be noted that step 605 to step 607 may also be performed before step 601 to step 604. For example, the second functional unit may first indicate the first functional unit to report the network capacity parameter of the first area based on the network capacity performance monitoring intention, then the second functional unit determines the network capacity optimization target based on the network capacity parameter of the first area, and then step 601 to step 604 are performed. Also, step 605 to step 607 may alternatively be performed after step 601 to step 604. For example, the second functional unit first provides the network capacity optimization requirement information of the first area for the first functional unit, and then the first functional unit monitors an optimized network capacity parameter of the first area based on the network capacity performance monitoring intention.

In a possible implementation, step 503 may be implemented in the following manner.

Step 31: The first functional unit obtains first data based on the network capacity optimization requirement information. The first data is used to determine at least a root cause of a network capacity issue that exists in the first area.

For example, step 31 may be implemented in the following manner.

Step 311: The first functional unit determines a data collection rule based on the network capacity optimization requirement information. The data collection rule includes one or more of the following information: identifiers of one or more first network elements in the first area, a data type, and a network element data collection periodicity. The one or more first network elements are network elements that provide network element data. The data type indicates a type of the network element data obtained from the one or more first network elements. The collection periodicity of the network element data indicates a periodicity of collecting the network element data. Network element performance data and configuration data may be considered as the network element data. For example, a first network element may be an identifier of an AMF network element managing the first area. In this case, the first functional unit may obtain network element performance data and configuration data of one or more cells in the first area from the AMF network element. Alternatively, a first network element may be identifiers of one or more base stations in the first area. In this way, the first functional unit may obtain, from each base station, network element performance data and configuration data that correspond to one or more cells covered by the base station. Alternatively, a first network element may be an NWDAF network element. In this way, the first functional unit may obtain, from the NWDAF network element, network element performance data and configuration data that correspond to cells in the first area. This is not limited in this embodiment.

Step 312: The first functional unit collects, as the first data, network element performance data and configuration data from each of the one or more first network elements according to the data collection rule. The network element performance data includes one or more of the following information: a physical resource block usage rate of a cell, an average user quantity of a cell, and a radio resource control connected user quantity of a cell. The configuration data includes one or more of the following information corresponding to the network element: a load balancing function configuration parameter, a neighbor relationship, and grid information.

Step 32: The first functional unit determines, based on the first data, the root cause of the network capacity issue that occurs in the first area.

In an example, step 32 may be implemented in the following manner: the first functional unit determines, based on the first data, the network capacity issue that exists in the first area. The first functional unit analyzes the network capacity issue that exists in the first area, to obtain the root cause of the network capacity issue.

In a specific implementation, when determining that the network capacity issue exists in the first area, the first functional unit performs in-depth analysis on the network capacity issue, and identifies the root cause of the network capacity issue (for example, an LB parameter of some cells is improperly configured, or handover of some cells is excessively frequently performed).

Step 33: The first functional unit determines a network capacity optimization solution for the first area based on the root cause of the network capacity issue that occurs in the first area. For example, the network capacity optimization solution includes LB parameter adjustment, handover-related parameter adjustment, and the like for cells or base stations in which some network capacity issues exist.

In a possible embodiment, the first functional unit may further determine a network capacity optimization policy for the first area based on the network capacity optimization requirement information. The network capacity optimization policy includes one or more of the following: a network capacity issue root cause analysis policy and a network capacity optimization adjustment policy. The network capacity issue root cause analysis policy indicates a policy of analyzing the root cause of the network capacity issue that exists in the area, that is, a manner in which the root cause of the network capacity issue that exists in the area is analyzed with reference to the first data. The network capacity optimization adjustment policy is used to reflect which parameters of a second network element (for example, a base station or a cell) are preferentially adjusted during network capacity optimization, and for example, a network element handover-related parameter or an LB-related parameter is preferentially adjusted. Alternatively, the network capacity optimization adjustment policy is used to reflect adjustment of one or more of a handover-related parameter and an LB-related parameter.

It should be noted that, when the network capacity optimization adjustment policy is obtained, the first functional unit adjusts, based on a sequence, of adjusting a load balancing function control parameter and a handover-related parameter that are of the second network element during network capacity optimization, reflected in the network capacity optimization adjustment policy, one or more of the following parameters corresponding to the second network elements: load balancing function control parameters and handover-related parameters. Network capacity optimization adjustment policies corresponding to the second network elements may be the same. For example, if the network capacity optimization adjustment policy indicates to preferentially adjust a network element handover-type parameter, the first functional unit preferentially adjusts handover-type parameters of the second network elements in the first area when optimizing the network capacity of the first area. Network capacity optimization adjustment policies corresponding to the second network elements may be different. For example, the first functional unit may determine appropriate network capacity optimization adjustment policies for the second network elements based on an actual situation. If network capacity optimization adjustment policies of a second network element A and a second network element B are different, the first functional network element may adjust, according to the network capacity optimization adjustment policy of the second network element A, one or more of the following parameters corresponding to the second network element A: a load balancing function control parameter and a handover-related parameter. The first functional network element may adjust, according to the network capacity optimization adjustment policy of the second network element B, one or more of the following parameters corresponding to the second network element B: a load balancing function control parameter and a handover-related parameter. For example, the network capacity optimization adjustment policy of the second network element A may be adjusting the load balancing function control parameter. The network capacity optimization adjustment policy of the second network element B may be adjusting the load balancing function control parameter and the handover-related parameter.

One or more second network elements may be all network elements in the first area, or may be some network elements in the first area, for example, a network element that supports an LB function in the first area. This is not limited in this embodiment.

In a possible implementation, when the first functional unit determines the network capacity issue root cause analysis policy, that the first function determines, based on the first data, the root cause of the network capacity issue that occurs in the first area includes: the first function determines, based on the network capacity issue root cause analysis policy and the first data, the root cause of the network capacity issue that occurs in the first area.

In a possible implementation, that the first functional unit determines the network capacity optimization solution for the first area based on the root cause of the network capacity issue that occurs in the first area may be implemented in the following manner: the first functional unit determines, based on the root cause of the network capacity issue that occurs in the first area, one or more solutions for addressing the network capacity issue for the first area. A first functional unit determines an assessment result of each solution for addressing the network capacity issue. The assessment result of the solution for addressing the network capacity issue is used to reflect one or more of the following parameters corresponding to the solution for addressing the network capacity issue: user experience, whether the network capacity optimization target is satisfied, and an adjustment cost. The first functional unit uses, based on the assessment result of each solution for addressing the network capacity issue, an optimal solution for addressing the network capacity issue in the one or more solutions for addressing the network capacity issue as the network capacity optimization solution. The network capacity optimization solution includes at least the following: identifiers of the one or more second network elements for which load balancing functions need to be enabled in the first area, and one or more of the following parameters corresponding to the one or more second network elements: load balancing function control parameters and handover-related parameters. For example, the second network element may be a cell or a base station.

It should be noted that, different solutions for addressing the network capacity issue in the one or more solutions for addressing the network capacity issue correspond to different content.

In an example, the first functional unit may assess each solution for addressing the network capacity issue, or may feed back the network capacity issue that exists in the first area and each solution for addressing the network capacity issue to another device (for example, a network data analytics network element NWDAF or an MDAF (management data analytics network element)), so that the another device assesses each solution for addressing the network capacity issue. Then, the another device may feed back the assessment result of each solution for addressing the network capacity issue or an identifier of a target solution to the first functional unit. The identifier of the target solution identifies the target solution. Optionally, the first functional unit may further provide, for the another device, an identifier of each solution for addressing the network capacity issue. The target solution is one or more of solutions for addressing the network capacity issue. It should be noted that, the first functional unit may select one solution from the solutions for addressing the network capacity issue based on the assessment result of each solution for addressing the network capacity issue as the target solution when the first functional unit obtains the assessment result of each solution for addressing the network capacity issue from the another device.

It should be noted that, when a single solution for addressing the network capacity issue is determined for the first area, the first functional unit may directly use the solution for addressing the network capacity issue as the network capacity optimization solution. Alternatively, when a single solution for addressing the network capacity issue is determined for the first area, the first functional unit may assess the solution. If an assessment result indicates that a requirement is not satisfied (for example, the assessment result indicates that using the solution for addressing the network capacity issue causes one or more of the following cases: The user experience is lower than a preset user experience threshold, the network capacity optimization target cannot be satisfied, and the adjustment cost is higher than a preset adjustment cost threshold), the first functional unit may update the solution for addressing the network capacity issue, so that the following indicators corresponding to the updated solution for addressing the network capacity issue satisfy a requirement: The user experience is greater than or equal to the preset user experience threshold, the network capacity optimization target is satisfied, and the adjustment cost is less than or equal to the preset adjustment cost threshold. In this way, the first functional unit may determine the updated solution for addressing the network capacity issue as the network capacity optimization solution.

When a plurality of solutions for addressing the network capacity issue are determined for the first area, the first functional unit may select any one of the plurality of solutions for addressing the network capacity issue as the network capacity optimization solution. Alternatively, the first functional unit selects one solution as the network capacity optimization solution based on an assessment result of each solution for addressing the network capacity issue. It should be noted that, when selecting a solution as the network capacity optimization solution based on the assessment result, the first functional unit may not only use an optimal solution as the network capacity optimization solution, but also use a solution that satisfies a preset requirement in the plurality of solutions as the network capacity optimization solution. For example, if an adjustment cost of a solution 1 and an adjustment cost of a solution 2 are the same, and user experience of the solution 1 is higher than that of the solution 2, but the user experience of the solution 1 and the user experience of the solution 2 are both higher than a preset user experience threshold, the first functional unit may use the solution 1 as the network capacity optimization solution. Alternatively, the solution 2 is used as the network capacity optimization solution. It should be noted that, when the network capacity optimization solution is selected from the plurality of solutions, different elements in user experience, an adjustment cost, and whether the network capacity optimization target is satisfied correspond to different weights, that is, a comparison result of an element with a higher weight is preferentially considered in determining an assessment result.

For example, if the weight of whether the network capacity optimization target is satisfied is higher than that of the user experience, and the weight of the user experience is higher than that of the adjustment cost, if a solution A satisfies the network capacity optimization target, a solution B does not satisfy the network capacity optimization target, an adjustment cost corresponding to the solution A is higher than an adjustment cost corresponding to the solution B, and user experience of the solution A is higher than user experience of the solution B, the solution A is determined as the network capacity optimization solution.

It should be noted that the weights corresponding to the different elements in the user experience, the adjustment cost, and the network capacity optimization target may be determined by the first functional network element, or may be indicated by the second functional network element to the first functional network element. This is not limited in this embodiment.

For example, the adjustment cost in this embodiment may be a cost generated when a network capacity is optimized by using the solution for addressing the network capacity issue, for example, a quantity of base stations/cells for which an LB function needs to be enabled. For example, if the solution 1 indicates that the LB function of 100 cells/base stations needs to be enabled when the network capacity issue is addressed, and the solution 2 indicates that the LB function of 50 cells/base stations needs to be enabled when the network capacity issue is addressed, it may be considered that the adjustment cost of the solution 1 is higher than the adjustment cost of the solution 2. In addition, when the quantities of cells/base stations for which the LB function needs to be enabled are indicated to be the same or close in the solution 1 and the solution 2, if the user experience of the solution 1 is lower than the user experience of the solution 2, it may also be considered that the adjustment cost of the solution 1 is higher than the adjustment cost of the solution 2.

In a possible implementation, the network capacity optimization solution includes at least identifiers of one or more second network elements in the first area, and one or more of the following parameters corresponding to the one or more second network elements: load balancing function control parameters and handover-related parameters. The second network element is a network element for which the load balancing function needs to be enabled. Correspondingly, step 503 in this embodiment may be implemented in the following manner: The first functional network element enables load balancing functions of the one or more second network elements based on the network capacity optimization solution, and adjusts the load balancing function control parameters of the one or more second network elements based on the load balancing function control parameters corresponding to the second network elements, and/or adjusts handover-related parameters of the second network elements, where the handover-related parameter includes a handover failure rate.

In a possible embodiment, when the first functional unit obtains the network capacity optimization requirement information, the method provided in this embodiment further includes: the first functional unit determines a management object of a network capacity optimization intention, and configures the received network capacity optimization requirement information in the management object of the network capacity optimization intention. Optionally, the first functional unit further allocates an identifier of the network capacity optimization intention. The identifier of the network capacity optimization intention may further be an identifier of the management object of the network capacity optimization intention. For example, the first functional unit creates the management object for the network capacity optimization intention when determining that no management object of the network capacity optimization intention exists.

Figure 7:
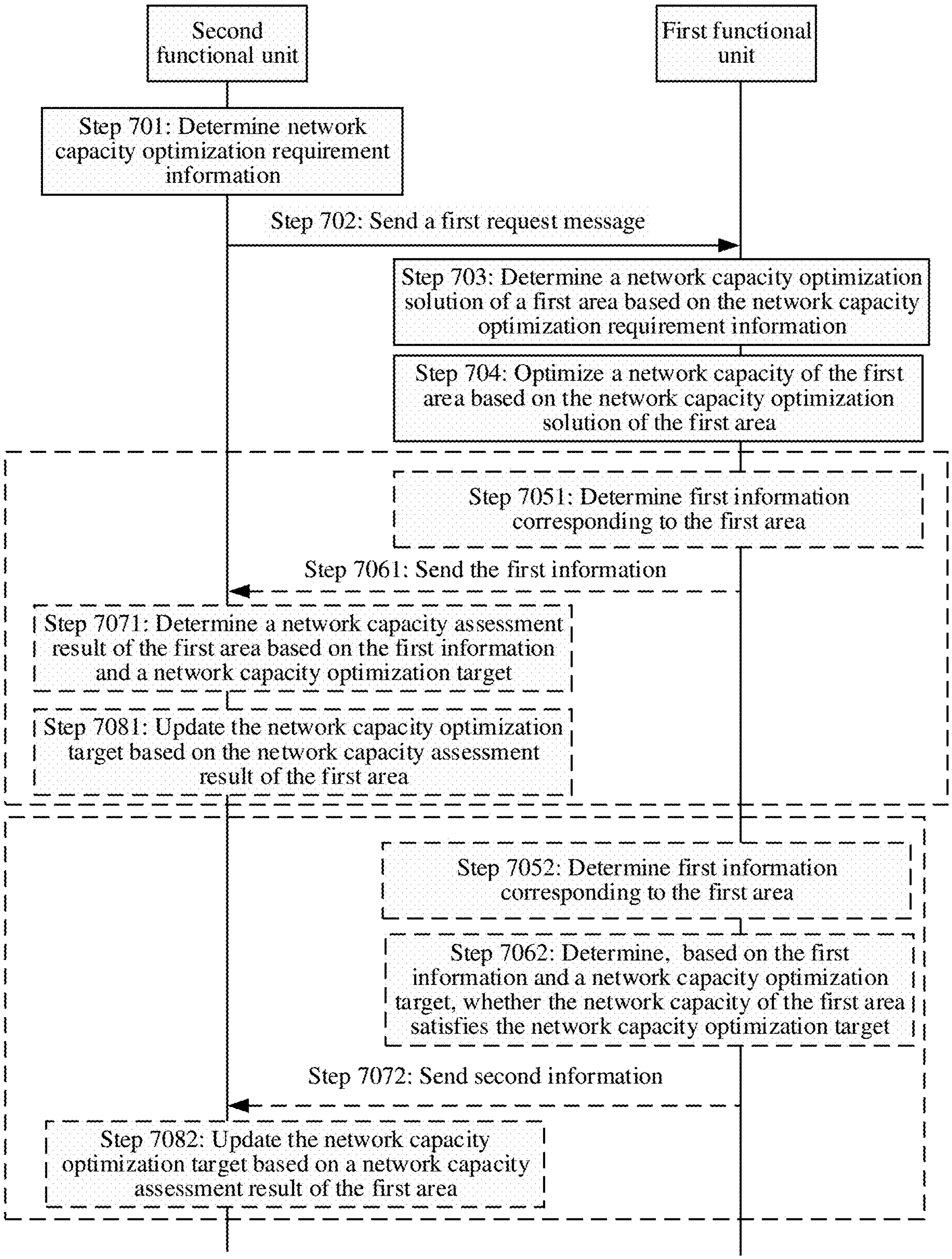
FIG. 7 is a schematic flowchart of interaction in a network capacity optimization method according to an embodiment.

The foregoing solution describes a process in which the first functional unit interacts with the second functional unit to optimize the network capacity of the first area. In some embodiments, after the network capacity of the first area is optimized, whether the optimized network capacity is satisfied needs to be further assessed. Therefore, as shown in FIG. 7, in addition to step 701 to step 704 (corresponding to step 501 to step 504), another network capacity optimization method provided in an embodiment may further include the following steps.

Step 7051: The first functional unit determines first information corresponding to the first area. The first information includes one or more of the following information: a first quantity of high-load cells, a first quantity of load imbalance cells, a first proportion of high-load cells, and a first proportion of load imbalance cells.

Optionally, the first information includes one or more of the following information corresponding to each second frequency band: a first quantity of high-load cells, a first quantity of load imbalance cells, a first proportion of high-load cells, and a first proportion of load imbalance cells.

For example, the first information includes a first quantity of high-load cells, a first quantity of load imbalance cells, a first proportion of high-load cells, and a first proportion of load imbalance cells that correspond to a frequency band 1. Alternatively, the first information includes first quantities of high-load cells, first quantities of load imbalance cells, first proportions of the high-load cells, and first proportions of the load imbalance cells that respectively correspond to a frequency band 1 and a frequency band 2.

For example, the first functional unit sends a plurality of groups of [frequency band information, quantity of high-load cells, quantity of load imbalance cells, proportion of the high-load cells, and proportion of the load imbalance cells], for example, [F10M, quantity of high-load cells, quantity of load imbalance cells, proportion of the high-load cells, proportion of the load imbalance cells] and [F20M, quantity of high-load cells, quantity of load imbalance cells, proportion of the high-loaded cells, proportion of the load imbalance cells], to the second functional unit.

In an example, step 7051 may be implemented in the following manner: The first functional unit collects network capacity performance data of any cell in the first area from one or more network elements in the first area. The network capacity performance data includes one or more of the following information: a physical resource block usage rate of a cell, an average user quantity of a cell, a radio resource control connected user quantity of a cell, and an available capacity of a cell. The first functional unit determines, based on the network capacity optimization limitation condition and the network capacity performance data of the any cell, the first information corresponding to the first area.

For example, the first functional unit obtains cell physical resource block usage rates respectively corresponding to 100 cells in the first area. If cell physical resource block usage rates corresponding to 30 cells in the 100 cells are greater than or equal to the first threshold, it may be determined that the 30 cells are high-load cells, that is, the quantity of high-load cells in the first area is 30. If a difference between physical resource block usage rates between 30 neighboring cells in the 100 cells is greater than or equal to the fifth threshold, it may be determined that the quantity of load imbalance cells in the first area is 30.

It should be noted that, for a manner in which the first functional unit counts the radio resource control connected user quantity of the cell and the available capacity of the cell in the first area based on the first information corresponding to the first area, refer to the foregoing manner of counting the quantity of high-load cells, and details are not described herein again.

In addition, if the first information includes one or more of the following information corresponding to one or more second frequency bands: a first quantity of high-load cells, a first quantity of load imbalance cells, a first proportion of high-load cells, and a first proportion of load imbalance cells, the first functional unit may obtain network capacity performance data corresponding to each cell in the second frequency band, and then counts, by referring to the foregoing manner, the first quantity of high-load cells, the first quantity of load imbalance cells, the first proportion of the high-load cells, and the first proportion of the load imbalance cells that correspond to each second frequency band. Then, the first functional unit compares the first quantity that is of high-load cells and that corresponds to the second frequency band with a maximum value of a quantity that is of high-load cells and that corresponds to the second frequency band, to determine whether a network capacity of the second frequency band satisfies a requirement.

Step 7061: The first functional unit sends the first information to the second functional unit, and correspondingly, the second functional unit receives the first information from the first functional unit.

Step 7071: The second functional unit determines a network capacity assessment result of the first area based on the first information and the network capacity optimization target. The assessment result is used to reflect whether the network capacity of the first area satisfies the network capacity optimization target.

For example, step 7071 may be implemented in the following manner: the second functional unit determines whether the first quantity of high-load cells in the first area is less than or equal to the maximum value of the quantity of high-load cells. If the first quantity (the first proportion) of high-load cells is less than or equal to the maximum value of the quantity (the maximum value of the proportion) of high-load cells, it is determined that the network capacity of the first area satisfies the network capacity optimization target. Alternatively, if the first quantity (the first proportion) of load imbalance cells is less than or equal to the maximum value of the quantity (the maximum value of the proportion) of load imbalance cells, it is determined that the network capacity of the first area satisfies the network capacity optimization target. Alternatively, when the first quantity (the first proportion) of high-load cells is less than or equal to the maximum value of the quantity (the maximum value of the proportion) of high-load cells, and the first quantity (the first proportion) of load imbalance cells is less than or equal to the maximum value of the quantity (the maximum value of the proportion) of load imbalance cells, the second functional unit determines that the network capacity optimization target is satisfied. If the first quantity (the first proportion) of high-load cells is greater than the maximum value of the quantity (the maximum value of the proportion) of high-load cells, it is determined that the network capacity of the first area does not satisfy the network capacity optimization target. If the first quantity (the first proportion) of load imbalance cells is greater than the maximum value of the quantity (the maximum value of the proportion) of load imbalance cells, it is determined that the network capacity of the first area does not satisfy the network capacity optimization target. Alternatively, if the first quantity (the first proportion) of load imbalance cells is greater than the maximum value of the quantity (the maximum value of the proportion) of load imbalance cells, and the first quantity (the first proportion) of high-load cells is greater than the maximum value of the quantity (the maximum value of the proportion) of high-load cells, it is determined that the network capacity of the first area does not satisfy the network capacity optimization target.

Step 7081: The second functional unit updates the network capacity optimization target based on the network capacity assessment result of the first area.

It should be noted that, when the network capacity assessment result indicates that the network capacity optimization target is not satisfied, the second functional unit may increase the maximum value of the proportion of load imbalance cells or the maximum value of the quantity of load imbalance cells in the network capacity optimization target. Alternatively, the second functional unit increases, based on an actual situation, the maximum value of the proportion of high-load cells or the maximum value of the quantity of high-load cells in the network capacity optimization target.

It should be noted that, when the network capacity assessment result indicates that the network capacity optimization target is satisfied, the second functional unit may not adjust the network capacity optimization target. Optionally, if the first quantity (the first proportion) of high-load cells in the first area is far less than the maximum value of the quantity (the maximum value of the proportion) of high-load cells, the second functional unit may decrease the maximum value of the proportion of high-load cells or the maximum value of the quantity of high-load cells in the network capacity optimization target. If the first quantity (the first proportion) of load imbalance cells in the first area is far less than the maximum value of the quantity (the maximum value of the proportion) of load imbalance cells, the second functional unit may decrease the maximum value of the quantity (the maximum value of the proportion) of load imbalance cells in the network capacity optimization target. Alternatively, if the first quantity (the first proportion) of high-load cells in the first area is close to the maximum value of the quantity (the maximum value of the proportion) of high-load cells, the second functional unit may keep the maximum value of the proportion of high-load cells or the maximum value of the quantity of high-load cells in the network capacity optimization target unchanged. If the first quantity (the first proportion) of load imbalance cells in the first area is close to or less than the maximum value of the quantity (the maximum value of the proportion) of load imbalance cells, the second functional unit may keep the maximum value of the quantity (the maximum value of the proportion) of load imbalance cells in the network capacity optimization target unchanged. It should be noted that, when either of the quantity (proportion) of high-load cells and the quantity (proportion) of load imbalance cells satisfies and the other one dissatisfies the maximum value of the proportion or the maximum value of the quantity, the second functional unit may update only the maximum value of the proportion or the maximum value of the quantity that corresponds to the dissatisfying one.

In another possible embodiment, after the network capacity optimization target is updated, the second functional unit may feed back the updated network capacity optimization target to the first functional unit. In this way, the first functional unit may re-determine a network capacity optimization solution for the first area based on the updated network capacity optimization target.

As shown in FIG. 7, in addition to step 701 to step 704 (corresponding to step 501 to step 504), the network capacity optimization method provided in this embodiment may further include the following steps.

Step 7052: The first functional unit determines first information corresponding to the first area, where the first information includes one or more of the following information: a first quantity of high-load cells, a first quantity of load imbalance cells, a first proportion of high-load cells, and a first proportion of load imbalance cells.

For a specific implementation of step 7052, refer to the descriptions of step 7051. Details are not described herein again.

Step 7062: The first functional unit determines, based on the first information and the network capacity optimization target, whether the network capacity of the first area satisfies the network capacity optimization target.

It should be noted that, in a possible embodiment, if the first functional unit determines, by using step 7052 and step 7062, one or more of the first proportion of the high-load cells and the first proportion of the load imbalance cells in the first area after optimization do not satisfy the network capacity optimization target, the first functional unit may continue to perform step 501 to step 504, that is, continue to optimize the network capacity of the first area. If the network capacity of the first area still does not satisfy the network capacity optimization target after a plurality of times of optimization, the first functional unit may perform step 7072 and step 7082. In this case, the second information indicates that the network capacity of the first area does not satisfy the network capacity optimization target. If the network capacity of the first area satisfies the network capacity optimization target after a plurality of times of optimization, the second information fed back by the first functional unit indicates that the network capacity of the first area satisfies the network capacity optimization target. In an example, when the network capacity optimization target is not satisfied, a quantity of times the first functional unit continues to perform optimization may be indicated by the second functional unit or may be determined by the first functional unit. In other words, the second functional unit may indicate, to the first functional unit, a maximum quantity of times of performing network capacity optimization for one piece of network capacity optimization requirement information. The maximum quantity of times may be 1 or 3. This is not limited in this embodiment. When the maximum quantity of times is reached, if the network capacity of the first area still does not satisfy the network capacity optimization target after the plurality of times of optimization, the first functional unit may perform step 7072.

Step 7072: The first functional unit sends the second information to the second functional unit, and correspondingly, the second functional unit receives the second information from the first functional unit. The second information is used to determine whether the network capacity of the first area satisfies the network capacity optimization target. For example, the second information may be a network capacity assessment result of the first area. Alternatively, the second information may further include the first information in addition to the network capacity assessment result.

Step 7082 is the same as step 7081, and details are not described herein again.

It should be noted that a difference between step 7051 to step 7081 and step 7052 to step 7082 lies in that, in step 7051 to step 7081, the first functional unit assesses whether the network capacity is satisfied. In step 7052 to step 7082, the second functional unit assesses, based on information from the first functional unit, whether the network capacity is satisfied.

It should be noted that, the first functional unit may actively send the second information/the first information to the second functional unit, or the first functional unit may send the second information/the first information to the second functional unit when the first functional unit satisfies a preset condition. For example, the first functional unit reports the second information/the first information to the second functional unit in a periodicity indicated by the second functional unit. Alternatively, the first functional unit receives a trigger message from the second functional unit, where the trigger message indicates to report the second information/the first information to the second functional unit. It should be noted that, the trigger message may further indicates a type of data fed back by the first functional unit to the second functional unit, for example, whether the first information or the assessment result is fed back.

In a possible embodiment, the method provided may further include: the first functional unit sends an identifier of the network capacity optimization intention to the second functional unit, and correspondingly, the second functional unit receives the identifier of the network capacity optimization intention from the first functional unit.

It should be noted that the identifier of the network capacity optimization intention and the first information/second information may be carried in a same message. Additionally, the identifier of the network capacity optimization intention and the first information/second information may alternatively be carried in different messages. This is not limited in this embodiment.

When the second functional unit receives the identifier of the network capacity optimization intention, if the second functional unit updates the network capacity optimization target, the second functional unit may further send the identifier of the network capacity optimization intention when feeding back the updated network capacity optimization target to the first functional unit. This helps the first functional unit configure the updated network capacity optimization target in a management object associated with the identifier of the network capacity optimization intention.

In a possible embodiment, in addition to updating the network capacity optimization target, the second functional unit may further update the network capacity optimization limitation condition. For example, the second functional unit may update the network capacity optimization limitation condition of the first area based on performance indicator information that is of cells in the first area and that is obtained by the first functional unit. For example, for a specific update process, refer to the process of determining thresholds corresponding to performance indicators described in step 12. Details are not described herein again.

The foregoing describes the solutions in embodiments from a perspective of interaction between network elements. It may be understood that, to implement the foregoing functions, the network elements such as the first functional unit and the second functional unit include corresponding structures and/or software modules for performing the functions. A person skilled in the art should be aware that, in combination with units and algorithm steps of the examples described in embodiments, the embodiments may be implemented by hardware or a combination of hardware and computer software. Whether a function is performed by hardware or hardware driven by computer software depends on particular applications and design constraints of the solutions. A person skilled in the art may use different methods to implement the described functions for each particular application, but it should not be considered that the implementation goes beyond the scope of the embodiments.

In embodiments, functional unit division may be performed based on the first functional unit and the second functional unit in the foregoing method examples. For example, functional units may be obtained through division based on corresponding functions, or two or more functions may be integrated into one processing unit. The integrated unit may be implemented in a form of hardware, or may be implemented in a form of a software functional unit. It should be noted that, in embodiments, division into the units is an example, and is merely logical function division. During actual implementation, another division manner may be used.

The foregoing describes the method in embodiments with reference to FIG. 5 to FIG. 7. The following describes a communication apparatus that is provided in embodiments and that performs the foregoing method. A person skilled in the art may understand that the method and the apparatus may be mutually combined and referenced. The communication apparatus provided in embodiments may perform the steps performed by the first functional unit and the second functional unit in the foregoing network capacity optimization method.

Figure 8:
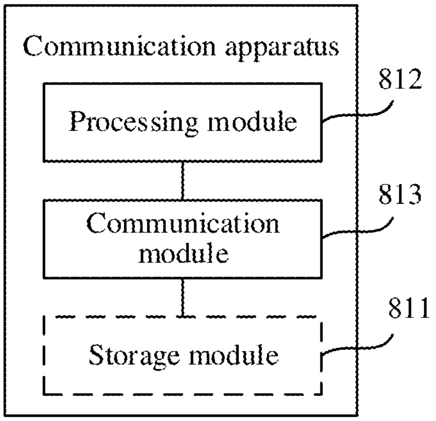
FIG. 8 is a schematic diagram of a structure of another communication apparatus according to an embodiment.

When the integrated unit is used, FIG. 8 shows a communication apparatus in the foregoing embodiment. The communication apparatus may include a communication module 813 and a processing module 812.

In an optional implementation, the communication apparatus may further include a storage module 811, configured to store program code and data of the communication apparatus.

In an example, the communication apparatus is a first functional unit, or a chip used in the first functional unit. In this case, the communication module 813 is configured to support the communication apparatus in communicating with an external network element (for example, a second functional unit). For example, the communication module 813 is configured to perform a signal receiving and sending operation of the first functional unit in the foregoing method embodiment. The processing module 812 is configured to perform a signal processing operation of the first functional unit in the foregoing method embodiment.

For example, the communication module 813 is configured to perform the receiving action performed by the first functional unit in step 502 in FIG. 5 in the foregoing embodiment. The processing module 812 is configured to support the communication apparatus in performing the actions performed by the first functional unit in step 503 and step 504 in FIG. 5.

In a possible embodiment, when the communication apparatus is a first functional unit or a chip used in the first functional unit, as shown in FIG. 6 and FIG. 7, the communication module 813 is further configured to support the communication apparatus in performing the receiving action in step 605 in FIG. 6 and the sending action in step 607 in FIG. 6. The processing module 812 is further configured to support the communication apparatus in performing the action performed by the first functional unit in step 606 in FIG. 6. Alternatively, the communication module 813 is further configured to support the communication apparatus in performing the sending action in step 7061 in FIG. 7. The processing module 812 is further configured to support the communication apparatus in performing the action performed by the first functional unit in step 7051 in FIG. 7. Alternatively, the communication module 813 is further configured to support the communication apparatus in performing the sending action in step 7072 in FIG. 7. The processing module 812 is further configured to support the communication apparatus in performing the actions performed by the first functional unit in step 7052 and step 7062 in FIG. 7.

In another example, the communication apparatus is a second functional unit, or a chip used in the second functional unit. In this case, the communication module 813 is configured to support the communication apparatus in communicating with an external network element (for example, a first functional unit). For example, the communication module 813 is configured to perform a signal receiving and sending operation of the second functional unit in the foregoing method embodiment. The processing module 812 is configured to perform a signal processing operation of the second functional unit in the foregoing method embodiment.

For example, the communication module 813 is configured to perform the sending action performed by the second functional unit in step 502 in FIG. 5 in the foregoing embodiment. The processing module 812 is configured to support the communication apparatus in performing the action performed by the second functional unit in step 501 in FIG. 5.

In a possible embodiment, when the communication apparatus is a first functional unit or a chip used in the first functional unit, as shown in FIG. 6 and FIG. 7, the communication module 813 is further configured to support the communication apparatus in performing the sending action performed by the second functional unit in step 605 in FIG. 6 and the receiving action performed by the second functional unit in step 607 in FIG. 6, the receiving action performed by the second functional unit in step 7061 or step 7072 in FIG. 7 and the steps in step 7071 and step 7081 performed by the second functional unit in FIG. 7, or the step in step 7082 performed by the second functional unit in FIG. 7.

The processing module 812 may be a processor or a controller. For example, the processing module may be a central processing unit, a general-purpose processor, a digital signal processor, an application-specific integrated circuit, a field programmable gate array or another programmable logic device, a transistor logic device, a hardware component, or any combination thereof. The processing module may implement or execute various example logical blocks, modules, and circuits described with reference to content in the embodiments. Alternatively, the processor may be a combination of processors implementing a computing function, for example, a combination of one or more microprocessors, or a combination of the digital signal processor and a microprocessor. The communication module may be a transceiver, a transceiver circuit, a communication interface, or the like. The storage module may be a memory.

When the processing module 812 is the processor 401 or the processor 405, the communication module 813 is the communication interface 403, and the storage module 811 is the memory 402, the communication apparatus in the embodiments may be the communication apparatus shown in FIG. 4.

Figure 9:
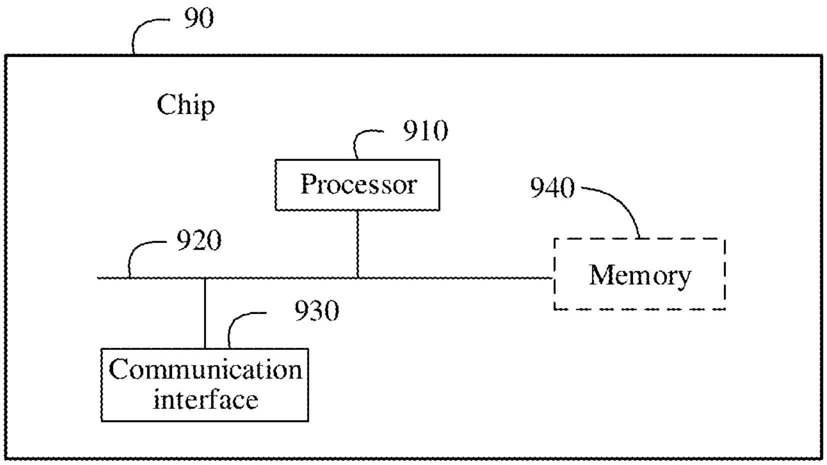
FIG. 9 is a schematic diagram of a structure of a chip according to an embodiment.

FIG. 9 is a schematic diagram of a structure of a chip 90 according to an embodiment. The chip 90 includes one or more (including two) processors 910 and a communication interface 930.

Optionally, the chip 90 further includes a memory 940. The memory 940 may include a read-only memory and a random access memory, and provide an operation instruction and data for the processor 910. A part of the memory 940 may further include a non-volatile random access memory (NVRAM).

In some implementations, the memory 940 stores the following elements: an executable module or a data structure, a subset thereof, or an extended set thereof.

In this embodiment, a corresponding operation is performed by invoking the operation instruction (the operation instruction may be stored in an operating system) stored in the memory 940.

In a possible implementation, a structure of a chip used by the first functional unit and a structure of a chip used by the second functional unit are similar, and different apparatuses may use different chips to implement respective functions.

The processor 910 controls a processing operation of any one of the first functional unit and the second functional unit, and the processor 910 may also be referred to as a central processing unit (CPU).

The memory 940 may include a read-only memory and a random access memory, and may provide instructions and data for the processor 910. A part of the memory 940 may further include an NVRAM. For example, during application, the memory 940, the communication interface 930, and the memory 940 are coupled together by using a bus system 920. In addition to a data bus, the bus system 920 may further include a power bus, a control bus, a status signal bus, and the like. However, for clear descriptions, various buses are marked as the bus system 920 in FIG. 9.

The methods in the embodiments may be applied to the processor 910, or may be implemented by the processor 910. The processor 910 may be an integrated circuit chip with a signal processing capability. In an implementation process, each step of the foregoing method may be implemented by a hardware integrated logic circuit in the processor 910 or by instructions in a software form. The processor 910 may be a general-purpose processor, a digital signal processor (DSP), an ASIC, a field-programmable gate array (FPGA) or another programmable logic device, a discrete gate or a transistor logic device, or a discrete hardware component. It may implement or perform the methods, the steps, and logical block diagrams in embodiments. The general-purpose processor may be a microprocessor, or the processor may be any conventional processor or the like. Steps of the methods with reference to the embodiments may be directly executed and accomplished through a hardware decoding processor, or may be executed and accomplished by using a combination of hardware and software modules in the decoding processor. A software module may be located in a mature storage medium in the art, for example, a random access memory, a flash memory, a read-only memory, a programmable read-only memory, an electrically erasable programmable memory, or a register. The storage medium is located in the memory 940. The processor 910 reads information from the memory 940, and completes the steps of the foregoing methods in combination with hardware thereof.

In a possible implementation, the communication interface 930 is configured to perform the receiving and sending steps of the first functional unit and the second functional unit in the embodiments shown in FIG. 5 to FIG. 7. The processor 910 is configured to perform the processing steps of the first functional unit and the second functional unit in the embodiments shown in FIG. 5 to FIG. 7.

The communication module may be a communication interface of the apparatus, and is configured to receive a signal from another apparatus. For example, when the apparatus is implemented as a chip, the communication module is a communication interface used by the chip to receive a signal from or send a signal to another chip or apparatus.

According to one aspect, a non-transitory computer-readable storage medium is provided. The non-transitory computer-readable storage medium stores instructions. When the instructions are run, the functions performed by the first functional unit in FIG. 5 to FIG. 7 are implemented.

According to one aspect, a non-transitory computer-readable storage medium is provided. The non-transitory computer-readable storage medium stores instructions. When the instructions are run, the functions performed by the second functional unit in FIG. 5 to FIG. 7 are implemented.

According to one aspect, a computer program product including instructions is provided, where the computer program product includes the instructions. When the instructions are run, the functions performed by the second functional unit in FIG. 5 to FIG. 7 are implemented.

According to another aspect, a computer program product including instructions is provided, where the computer program product includes the instructions. When the instructions are run, the functions performed by the first functional unit in FIG. 5 to FIG. 7 are implemented.

According to one aspect, a chip is provided. The chip is used in a first terminal. The chip includes at least one processor and a communication interface. The communication interface is coupled to the at least one processor. The processor is configured to run instructions, to implement the functions performed by the first functional unit in FIG. 5 to FIG. 7.

According to another aspect, an embodiment provides a chip. The chip is used in an access management network element. The chip includes at least one processor and a communication interface. The communication interface is coupled to the at least one processor. The processor is configured to run instructions, to implement the functions performed by the second functional unit in FIG. 5 to FIG. 7.

An embodiment provides a communication system. The communication system includes a first functional unit and a second functional unit. The first functional unit is configured to perform the functions performed by the first functional unit in FIG. 5 to FIG. 7. The second functional unit is configured to perform the functions performed by the second functional unit in FIG. 5 to FIG. 7.

In a possible embodiment, the communication system may further include one or more first network elements (for example, base stations), and the one or more first network elements are configured to provide network capacity performance data of the first network element.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer programs and instructions. When the computer programs or instructions are loaded and executed on a computer, all or some of the procedures or functions in the embodiments are executed. The computer may be a general-purpose computer, a dedicated computer, a computer network, a network device, user equipment, or another programmable apparatus. The computer programs or instructions may be stored in a non-transitory computer-readable storage medium, or may be transmitted from a non-transitory computer-readable storage medium to another non-transitory computer-readable storage medium. For example, the computer programs or instructions may be transmitted from a website, computer, server, or data center to another website, computer, server, or data center in a wired or wireless manner. The non-transitory computer-readable storage medium may be any usable medium that can be accessed by a computer, or a data storage device, for example, a server or a data center, integrating one or more usable media. The usable medium may be a magnetic medium, for example, a floppy disk, a hard disk drive, or a magnetic tape, may be an optical medium, for example, a digital video disc (DVD), or may be a semiconductor medium, for example, a solid-state drive (SSD).

Although described with reference to embodiments, in a process of implementing the embodiments, a person skilled in the art may understand and implement another variation of the embodiments by viewing the accompanying drawings and described content Although described with reference to specific features and embodiments thereof, it is clear that various modifications and combinations may be made to them without departing from the spirit and scope of the embodiments. Correspondingly, the embodiments and accompanying drawings are merely examples, and are considered as any of or all modifications, variations, combinations or equivalents that cover the scope of embodiments. It is clearly that a person skilled in the art can make various modifications and variations to the embodiments without departing from their spirit and scope. In this way, is the embodiments intended to cover these modifications and variations.

What is claimed is:

1. A method, comprising:

obtaining network capacity optimization requirement information for a first area comprising a plurality of cells, wherein the network capacity optimization requirement information comprises a network capacity optimization target and a network capacity optimization limitation condition, the network capacity optimization limitation condition describing a determining condition of the network capacity performance of the first area, wherein the network capacity optimization target comprises one or more of: a first parameter describing a maximum value of a proportion or a quantity of high-load cells in the first area, or a second parameter describing a maximum value of a proportion or a quantity of load imbalance cells in the first area, wherein the network capacity optimization limitation condition comprises one or more of the following: a first determining condition, wherein the first determining condition comprises one or more conditions for determining that a cell is a high-load cell; or a second determining condition, wherein the second determining condition comprises one or more conditions for determining that a cell is a load imbalance cell;

determining, based on the network capacity optimization requirement information, a network capacity optimization solution that addresses at least a network capacity issue that exists in the first area; and optimizing a network capacity of the first area based on the network capacity optimization solution.

2. The method according to claim 1, wherein the network capacity optimization requirement information comprises optimization requirement information in one or more first frequency bands.

3. The method according to claim 1, wherein the network capacity optimization target further comprises one or more of:

a third parameter describing an average user quantity of each cell in the first area; or a fourth parameter describing a throughput of the first area.

4. The method according to claim 1, wherein the obtaining of the network capacity optimization requirement information comprises receiving a first request message, wherein the first request message comprises the network capacity optimization requirement information.

5. The method according to claim 1, wherein the first determining condition comprises one or more of:

a physical resource block usage rate of a cell is greater than or equal to a first threshold, an average user quantity of a cell is greater than or equal to a second threshold, a radio resource control connected user quantity of a cell is greater than or equal to a third threshold, or an available capacity of a cell is greater than or equal to a fourth threshold;

the second determining condition comprises one or more of:

a difference between physical resource block usage rates of neighboring cells is greater than or equal to a fifth threshold, a difference between average user quantities of neighboring cells is greater than or equal to an active-user quantity imbalance threshold, a radio resource control connected user quantity of a neighboring cell is greater than or equal to a sixth threshold, or an available capacity of a neighboring cell is less than or equal to a seventh threshold; and when the network capacity optimization requirement information comprises optimization requirement information in a plurality of first frequency bands, the network capacity optimization limitation condition further comprises a determining condition of load imbalance cells in the plurality of first frequency bands, and the determining condition of the load imbalance cells in the plurality of first frequency bands comprises one or more of:

a difference between physical resource block usage rates of neighboring cells in the plurality of first frequency bands is greater than or equal to an eighth threshold;

a difference between average user quantities of neighboring cells in the plurality of first frequency bands is greater than or equal to a ninth threshold;

radio resource control connected user quantities of neighboring cells in the plurality of first frequency bands are greater than or equal to a tenth threshold; or available capacities of neighboring cells in the plurality of first frequency bands are greater than or equal to an eleventh threshold.

6. The method according to claim 1, wherein determining the network capacity optimization solution for the first area based on the network capacity optimization requirement information comprises:

obtaining first data based on the network capacity optimization requirement information;

determining, based on the first data, the root cause of the network capacity issue that occurs in the first area; and determining the network capacity optimization solution for the first area based on the root cause of the network capacity issue that occurs in the first area.

7. The method according to claim 1, wherein after optimizing the network capacity of the first area based on the network capacity optimization solution, the method further comprises:

determining first information corresponding to the first area, wherein the first information comprises one or more of the following information: a first quantity of high-load cells, a first quantity of load imbalance cells, a first proportion of high-load cells, and a first proportion of load imbalance cells; and sending the first information.

8. The method according to claim 1, further comprising:

determining first information corresponding to the first area, wherein the first information comprises one or more of the following information: a first quantity of high-load cells, a first quantity of load imbalance cells, a first proportion of high-load cells, and a first proportion of load imbalance cells;

determining, based on the first information and the network capacity optimization target, whether the network capacity performance of the first area satisfies the network capacity optimization target; and sending second information, wherein the second information indicates whether the network capacity performance of the first area satisfies the network capacity optimization target.

9. A method, comprising:

determining network capacity optimization requirement information for a first area comprising a plurality of cells, wherein the network capacity optimization requirement information comprises a network capacity optimization target and a network capacity optimization limitation condition, the network capacity optimization limitation condition describing a determining condition of the network capacity performance of the first area, wherein the network capacity optimization target comprises one or more of: a first parameter describing a maximum value of a proportion or a quantity of high-load cells in the first area, or a second parameter describing a maximum value of a proportion or a quantity of load imbalance cells in the first area, wherein the network capacity optimization limitation condition comprises one or more of the following: a first determining condition, wherein the first determining condition comprises one or more conditions for determining that a cell is a high-load cell; or a second determining condition, wherein the second determining condition comprises one or more conditions for determining that a cell is a load imbalance cell; and sending a first request message, wherein the first request message comprises the network capacity optimization requirement information, and the first request message requests optimization of a network capacity of the first area based on the network capacity optimization requirement information.

10. The method according to claim 9, wherein the network capacity optimization requirement information comprises optimization requirement information in one or more first frequency bands.

11. The method according to claim 9, wherein the network capacity optimization target further comprises one or more of:

a third parameter describing an average user quantity of each cell in the first area; or a fourth parameter describing a throughput of the first area.

12. The method according to claim 9, wherein the first determining condition comprises one or more of:

a physical resource block usage rate of a cell is greater than or equal to a first threshold, an average user quantity of a cell is greater than or equal to a second threshold, a radio resource control connected user quantity of a cell is greater than or equal to a third threshold, or an available capacity of a cell is greater than or equal to a fourth threshold;

the second determining condition comprises one or more of:

a difference between physical resource block usage rates of neighboring cells is greater than or equal to a fifth threshold, a difference between average user quantities of neighboring cells is greater than or equal to an active-user quantity imbalance threshold, a radio resource control connected user quantity of a neighboring cell is greater than or equal to a sixth threshold, or an available capacity of a neighboring cell is less than or equal to a seventh threshold; and when the network capacity optimization requirement information comprises optimization requirement information in a plurality of first frequency bands, the network capacity optimization limitation condition further comprises a determining condition of load imbalance cells in the plurality of first frequency bands, and the determining condition of the load imbalance cells in the plurality of first frequency bands comprises one or more of:

a difference between physical resource block usage rates of neighboring cells in the plurality of first frequency bands is greater than or equal to an eighth threshold;

a difference between average user quantities of neighboring cells in the plurality of first frequency bands is greater than or equal to a ninth threshold;

radio resource control connected user quantities of neighboring cells in the plurality of first frequency bands are greater than or equal to a tenth threshold; or available capacities of neighboring cells in the plurality of first frequency bands are greater than or equal to an eleventh threshold.

13. The method according to claim 9, further comprising:

receiving first information, wherein the first information comprises one or more of: a first quantity of high-load cells, a first quantity of load imbalance cells, a first proportion of high-load cells, and a first proportion of load imbalance cells; and adjusting the network capacity optimization requirement information based on the first information and the network capacity optimization limitation condition.

14. The method according to claim 9, further comprising:

receiving second information, wherein the second information indicates whether the network capacity performance of the first area satisfies the network capacity optimization target; and adjusting the network capacity optimization requirement information based on the second information.

15. An apparatus, comprising:

at least one processor; and at least one memory coupled to the at least one processor and storing programming instructions that, when executed by the at least one processor, cause the apparatus to:

obtain network capacity optimization requirement information for a first area comprising a plurality of cells, wherein the network capacity optimization requirement information comprises a network capacity optimization target and a network capacity optimization limitation condition, the network capacity optimization limitation condition describing a determining condition of the network capacity performance of the first area, wherein the network capacity optimization target comprises one or more of: a first parameter describing a maximum value of a proportion or a quantity of high-load cells in the first area, or a second parameter describing a maximum value of a proportion or a quantity of load imbalance cells in the first area, wherein the network capacity optimization limitation condition comprises one or more of the following: a first determining condition, wherein the first determining condition comprises one or more conditions for determining that a cell is a high-load cell; or a second determining condition, wherein the second determining condition comprises one or more conditions for determining that a cell is a load imbalance cell;

determine, based on the network capacity optimization requirement information, a network capacity optimization solution that addresses at least a network capacity issue that exists in the first area; and optimize a network capacity of the first area based on the network capacity optimization solution.

16. The apparatus according to claim 15, wherein the network capacity optimization target further comprises one or more of:

a third parameter describing an average user quantity of each cell in the first area; or a fourth parameter describing a throughput of the first area.

17. The apparatus according to claim 15, wherein the obtaining of the network capacity optimization requirement information comprises receiving a first request message, wherein the first request message comprises the network capacity optimization requirement information.

18. An apparatus, comprising:

at least one processor; and at least one memory coupled to the at least one processor and storing programming instructions that, when executed by the at least one processor, cause the apparatus to:

determine network capacity optimization requirement information for a first area comprising a plurality of cells, wherein the network capacity optimization requirement information comprises a network capacity optimization target and a network capacity optimization limitation condition, the network capacity optimization limitation condition describing a determining condition of the network capacity performance of the first area, wherein the network capacity optimization target comprises one or more of: a first parameter describing a maximum value of a proportion or a quantity of high-load cells in the first area, or a second parameter describing a maximum value of a proportion or a quantity of load imbalance cells in the first area, wherein the network capacity optimization limitation condition comprises one or more of the following: a first determining condition, wherein the first determining condition comprises one or more conditions for determining that a cell is a high-load cell; or a second determining condition, wherein the second determining condition comprises one or more conditions for determining that a cell is a load imbalance cell; and send a first request message, wherein the first request message comprises the network capacity optimization requirement information, and the first request message requests optimization of a network capacity of the first area based on the network capacity optimization requirement information.

19. The apparatus according to claim 18, wherein the network capacity optimization target further comprises one or more of:

a third parameter describing an average user quantity of each cell in the first area; or a fourth parameter describing a throughput of the first area.

* * * * *